US011312646B2

(12) United States Patent
Gunasekaran et al.

(10) Patent No.: US 11,312,646 B2
(45) Date of Patent: Apr. 26, 2022

(54) METHOD TO REMEDIATE EFFLUENTS CONTAINING METALS COMPLEXED WITH ORGANIC AND/OR INORGANIC SPECIES

(71) Applicant: Wisconsin Alumni Research Foundation, Madison, WI (US)

(72) Inventors: Sundaram Gunasekaran, Madison, WI (US); Nael Yasri, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1515 days.

(21) Appl. No.: 14/819,665

(22) Filed: Aug. 6, 2015

(65) Prior Publication Data

US 2016/0039698 A1  Feb. 11, 2016

Related U.S. Application Data

(60) Provisional application No. 62/035,130, filed on Aug. 8, 2014.

(51) Int. Cl.
*C02F 9/00* (2006.01)
*C02F 1/467* (2006.01)
(Continued)

(52) U.S. Cl.
CPC .............. *C02F 9/00* (2013.01); *C02F 1/281* (2013.01); *C02F 1/283* (2013.01); *C02F 1/42* (2013.01);
(Continued)

(58) Field of Classification Search
CPC ...... C02F 1/46–488; C02F 9/00; C02F 1/281; C02F 1/283; C02F 1/42; C02F 1/461;
(Continued)

(56) References Cited

U.S. PATENT DOCUMENTS 3,703,453 A * 11/1972 Gordy et al. ......... C02F 1/4672
205/750
3,919,062 A * 11/1975 Lundquist, Jr ...... C02F 1/46114
205/753

(Continued)

FOREIGN PATENT DOCUMENTS

EP         0168752 A2   1/1986
WO    WO 99/026887 A1   6/1999
(Continued)

OTHER PUBLICATIONS

Encyclopedia Britannica (Mackenzie et al.), Seawater, Aug. 14, 2018. <https://www.britannica.com/science/seawater> (Year: 2018).*
(Continued)

*Primary Examiner* — Xiuyu Tai
(74) *Attorney, Agent, or Firm* — Joseph T. Leone, Esq.; DeWitt, LLP

(57) ABSTRACT

Described is a system and corresponding method for remediating liquid waste streams. The system includes an electro-oxidation (EO) chamber, an electro-deposition (ED) chamber, and an electro-adsorption (EA) chamber. In the method, a waste stream is subjected to electro-oxidation, followed by electro-deposition and/or electro-adsorption. The method removes both organic and inorganic pollutants, as well as metals present as free ions or bound into organic or inorganic complexes.

3 Claims, 11 Drawing Sheets

(51) Int. Cl.

| | | |
|---|---|---|
| C02F 101/30 | (2006.01) | |
| C02F 101/10 | (2006.01) | |
| C02F 103/30 | (2006.01) | |
| C02F 103/16 | (2006.01) | |
| C02F 1/42 | (2006.01) | |
| C02F 1/461 | (2006.01) | |
| C02F 1/28 | (2006.01) | |
| C02F 103/20 | (2006.01) | |
| C02F 103/28 | (2006.01) | |
| C02F 103/10 | (2006.01) | |
| C02F 103/14 | (2006.01) | |
| C02F 103/34 | (2006.01) | |

(52) U.S. Cl.
CPC ............ C02F 1/461 (2013.01); C02F 1/4672 (2013.01); C02F 2001/46138 (2013.01); C02F 2001/46157 (2013.01); C02F 2101/10 (2013.01); C02F 2101/30 (2013.01); C02F 2101/308 (2013.01); C02F 2103/10 (2013.01); C02F 2103/14 (2013.01); C02F 2103/16 (2013.01); C02F 2103/20 (2013.01); C02F 2103/28 (2013.01); C02F 2103/30 (2013.01); C02F 2103/346 (2013.01); Y02W 10/37 (2015.05)

(58) Field of Classification Search
CPC .......... C02F 1/4672; C02F 2001/46138; C02F 2001/46157; C02F 2101/10; C02F 2101/30; C02F 2101/308; C02F 2103/10; C02F 2103/14; C02F 2103/16; C02F 2103/20; C02F 2103/28; C02F 2103/30; C02F 2103/346; C02F 1/46109; C02F 2101/20; C02F 1/4691; C02F 1/46114; C02F 1/4676; C02F 2001/46128; Y02W 10/37; C22B 3/42; B01J 47/08; Y02P 10/234; Y02P 10/20; C25B 9/70; C25B 9/40

See application file for complete search history.

(56) References Cited

U.S. PATENT DOCUMENTS

| | | | |
|---|---|---|---|
| 4,161,435 A * | 7/1979 | Moeglich | C02F 1/46114 204/553 |
| 4,802,993 A | 2/1989 | Katoh | |
| 5,409,582 A * | 4/1995 | Wimbish | C02F 1/4678 204/237 |
| 5,804,057 A * | 9/1998 | Zhou | B01J 47/08 204/252 |
| 5,928,493 A | 7/1999 | Morkovsky et al. | |
| 8,337,702 B2 | 12/2012 | Ujang et al. | |
| 2004/0012913 A1* | 1/2004 | Andelman | C02F 1/4691 361/503 |
| 2007/0272055 A1* | 11/2007 | Lavine | C22B 3/045 75/303 |
| 2011/0272292 A1* | 11/2011 | Kaneko | C02F 1/469 205/560 |
| 2012/0067822 A1 | 3/2012 | Ujang et al. | |
| 2012/0160706 A1* | 6/2012 | Poirier | C02F 1/463 205/756 |
| 2014/0008243 A1 | 1/2014 | Neti et al. | |
| 2015/0166383 A1 | 6/2015 | Višnja et al. | |
| 2015/0307373 A1* | 10/2015 | Alencherry | C02F 1/4604 204/554 |

FOREIGN PATENT DOCUMENTS

| | | |
|---|---|---|
| WO | WO 03/027029 A1 | 4/2003 |
| WO | WO 10/137941 A1 | 2/2010 |
| WO | WO 12/076940 A1 | 6/2012 |
| WO | WO 13/144664 A1 | 3/2013 |

OTHER PUBLICATIONS

Abd El Rehm et al., Electroplating of copper films on steel substrates from acidic gluconate baths, Applied Surface Science, 165 (2000) 249-254.

Abou-Shady et al., Effect of pH on separation of Pb (II) and NO3—from aqueous solutions using electrodialysis, Desalination, 285 (2012) 46-53.

Bradl, H., Heavy Metals in the Environment: Origin, Interaction and Remediation, Academic Press 2005 (Book—Not Provided).

Calow, P.P., Handbook of Ecotoxicology, John Wiley & Sons 2009 (Book—Not Provided).

Carrier et al., Kinetics and reactional pathway of Imazapyr photocatalytic degradation Influence of pH and metallic ions, Applied Catalysis B: Environmental, 65 (2006) 11-20.

Charles et al., Advanced oxidation (UV-ozone) and cyclodextrin sorption: Effects of individual and combined action on the chemical abatement of organic pollutants in industrial effluents, Journal of the Taiwan Institute of Chemical Engineers, (2013).

Chaudhary et al., Separation of nickel from cobalt using electrodialysis in the presence of EDTA. J Appl Electrochem. 30 (2000) 439-445.

Chaudhary et al., The regeneration and recycle of chromium etching solutions using concentrator cell membrane technology, Chemosphere, 62 (2006) 841-846.

Chaudhary et al., Simultaneous recovery of metals and degradation of organic species: Copper and 2,4,5-trichlorophenoxyacetic acid (2,4,5-T), Journal of Hazardous Materials, 165 (2009) 825-831.

Czarnetzki et al., Formation of hypochlorite, Chlorate and oxygen during NaCl electrolysis from alkaline solutions at an RuO2/TiO2 anode, J Appl Electrochem, 22 (1992) 315-324.

Ding et al., A Study on the Use of Bipolar-Particles-Electrodes in Decolorization of Dyeing Effluents and Its Principle, Water Science & Technology, 19 (1987) 391-400.

Donaldson et al., Anodic oxidation of the dye materials methylene blue, acid blue 25, reactive blue 2 and reactive blue 15 and the characterisation of novel intermediate compounds in the anodic oxidation of methylene blue, J Chem Technol Biot, 77 (2002) 756-760.

Durán et al., Photocatalytic treatment of an industrial effluent using artificial and solar UV radiation: An operational cost study on a pilot plant scale, J Environ Manage, 98 (2012) 1-4.

Dzombak et al., Remediation of Metals—Contaminated Soils and Groundwater, Technology Evaluation Report, 1997.

Grimm et al., Review of electro-assisted methods for water purification, Desalination, 115 (1998) 285-294.

Güven et al., Electrochemical treatment of deproteinated whey wastewater and optimization of treatment conditions with response surface methodology, Journal of Hazardous Materials, 157 (2008) 69-78.

Hariz et al., Treatment of petroleum refinery sulfidic spent caustic wastes by electrocoagulation, Separation and Purification Technology, 107 (2013) 150-157.

Houghton et al., Mass-transport problems and some design concepts of electrochemical reactors, J Appl Electrochem, 4 (1974) 173-190.

Israilides et al., Olive oil wastewater treatment With the use of an electrolysis system, Bioresour Technol, 61 (1997) 163-170.

Janssen et al., The role of electrochemistry and electrochemical technology in environmental protection, Chemical Engineering Journal, 85 (2002) 137-146.

Kim et al., Pilot scale treatment of textile wastewater by combined process (fluidized biofilni process—chemical coagulation—electrochemical oxidation), Water Res, 36 (2002) 3979-3988.

Kocaoba et al., Removal of Chromium (III) and cadmium (II) from aqueous solutions. Desalination. 180 (2005) 151-156.

Konsowa, A.H., Intensification of the rate of heavy metal removal from wastewater by cementation in a jet reactor, Desalination, 254 (2010) 29-34.

Kumar et al., Redefining BOD:COD ratio of pulp mill industrial wastewaters in BOD analysis by formulating a specific microbial seed, International Biodeterioration & Biodegradation, 64 (2010) 197-202.

(56) References Cited

OTHER PUBLICATIONS

Manahan, S.E., Environmental Chemistry, 9 ed., CRC Press 2009 (Book—Not Provided)—Table of Contents Only).

Nabi et al., Sorption studies of metal ions on napthol blue-black modified Amberlite IR-400 anion exchange resin: Separation and determination of metal ion contents of pharmaceutical preparation, Colloids and Surfaces A: Physicochemical and Engineering Aspects, 280 (2006) 66-70.

Naumczyk et al., Electrochemical treatment of textile wastewater, Water Science and Technology, 34 (1996) 17-24.

Pérez et al., Combined strategy for the precipitation of heavy metals and biodegradation of petroleum in industrial wastewaters, Journal of Hazardous Materials, 182 (2010) 896-902.

Poulopoulos et al., Photochemical treatment of phenol aqueous solutions using ultraviolet radiation and hydrogen peroxide, Journal of Hazardous Materials, 129 (2006) 64-68.

Prairie et al., An investigation of titanium dioxide photocatalysis for the treatment of water contaminated with metals and organic chemicals, Environmental Science & Technology, 27 (1993) 1776-1782.

Quivet et al., Lanteri, Photochemical degradation of imazamox in aqueous solution: influence of metal ions and anionic species on the ultraviolet photolysis, Journal of agricultural and food chemistry, 54 (2006) 3641-3645.

Rivero-Huguet et al., Scaling up a treatment to simultaneously remove persistent organic pollutants and heavy metals from contaminated soils, Chemosphere, 83 (2011) 668-673.

Scialdone, O., Electrochemical oxidation of organic pollutants in water at metal oxide electrodes: A simple theoretical model including direct and indirect oxidation processes at the anodic surface, Electrochimica Acta, 54 (2009) 6140-6147.

Sigel et al., Royal Society of Chemistry (Great Britain), Organometallics in environment and toxicology, RSC Publishing, Cambridge, UK, 2010 (Book—Not Provided—Table of Contents Only).

Soderquist et al., Evaluation of the catalytic decomposition of H2O2 through use of organo-metallic complexes—a potential link to the luminol presumptive blood test, Forensic science international, 219 (2012) 101-105.

Song et al., Mechanism of the anodic oxidation of 4-Chloro-3-methyl phenol in aqueous solution using Ti/SnO2—Sb/PbO2 electrodes, Journal of Hazardous Materials, 175 (2010) 614-621.

Subashchandrabose et al., Mixotrophic cyanobacteria and microalgae as distinctive biological agents for organic pollutant degradation, Environment International, 51 (2013) 59-72.

Sulaymon et al., Competitive biosorption of lead mercury chromium and arsenic ions onto activated sludge in fixed bed adsorber, Journal of the Taiwan Institute of Chemical Engineers, (2013) In-Press.

Survila et al., Kinetics of Zinc and copper reduction in gluconate-sulfate solutions, Electrochimica Acta, 94 (2013) 307-313.

Tao et al., Removal of heavy metals from fly ash leachate using combined bioelectrochemical systems and electrolysis, Journal of Hazardous Materials, 264 (2014) 1-7.

Wang et al., Adsorption removal of organic dyes on covalent triazine framework (CTF), Microporous and Mesoporous Materials, 187 (2014) 63-70.

Yasri, N.G., Developments of electrochemistry in Environmental Technology, Brunel University, 2001, pp. 304.

Zhang et al., Three-dimensional electrochemical process for wastewater treatment: A general review, Chemical Engineering Journal, 228 (2013) 455-467.

\* cited by examiner

METHOD TO REMEDIATE EFFLUENTS CONTAINING METALS COMPLEXED WITH ORGANIC AND/OR INORGANIC SPECIES

CROSS-REFERENCE TO RELATED APPLICATIONS

Priority is hereby claimed to provisional application Ser. No. 62/035,130, filed Aug. 8, 2014, which is incorporated herein by reference.

FEDERAL FUNDING STATEMENT

This invention was made with government support trader 15 CRHF-0-6055 awarded by the USDA/NIFA. The government has certain rights in the invention.

BACKGROUND

Advances in technology and increased consumer demand for goods and services have resulted in higher amounts of pollutants in the environment. Pollutants are usually categorized under different subtypes and the most critically dangerous to the environment of those belong to the "Black List", which includes the persistent organic pollutants (POPs) such as organohalogen, organophosphorus, some metals and their organometallic complexes. Many POPs are toxic, persistent, resist conventional biological and chemical wastewater treatment and bioaccumulate in the environment [1]. Furthermore, it has been well established that the presence of metals in water and soil resources is highly influenced by the mobility and solubility of metals, which are driven by complexing reagents or organic species present [2, 3]. This highlights the need for efficient treatment steps to eliminate both of metal and organic species.

Appropriate treatment technology for hazardous wastes depends upon the nature of the wastes, species variation, and volume. In fact, the treatment methods for effluents containing metals differ in principle for those containing organics, and it is worth noting that the presence of organic pollutants is problematic for metal removal and vice versa. The presence of organic and inorganic complexing reagents changes the physicochemical properties of metals. They pose special difficulties due to the nature of the chemical interactions [4]. Consequently, it is frequently complicated to identify a treatment technique that can overcome these completed chemical entities [5]. Additionally, the concept of re-use (both of water and metals) is important in the waste management strategy in which the problems associated with composition alteration of effluent, chemical load, and generation of other pollution are of important considerations in developing new treatment methods.

In light of the above, there are very few existing methods that can remediate simultaneously waste streams containing metals and recalcitrant inorganic and organic metal complexes. Considering hydrated metal ions, several methods can be used for the removal and recovery from industrial effluents including chemical precipitation [5], biosorption [6] solvent extraction [7], cementation [8], electrodialysis [9, 10] and electrolysis [11]. However, there are practical limitations to most of these methods arising from the presence of organic and complexing regent pollutants.

Similarly, for streams containing organic material there are many possible methods which can be used to remediate or destroy organic species including adsorption [12], biological degradation [13] ozonization [14], solar radiation [15], treatment with ultraviolet radiation [16], coagulation, electro-coagulation [17] and anodic oxidation [18, 19]. Most electrolytic, photolytic, and photocatalytic treatments destroy organic compounds by reaction with the hydroxyl radical (OH.) or other free radicals produced in the system. The efficiency of many of these methods is reduced in the presence of metal ions and this is particularly true if the organic species form strong complexes with the metal ions in the solution [20].

The presence of organic and inorganic species with metal ions changes completely the chemical, physical, and toxicological properties of the metal ions [21]. For example, the presence of EDTA as a complexing agent in a metal-containing solution makes this complex a soluble anion as opposed to a metallic hydrated cation. Additionally, the presence of metal ions can retard the destruction of organic contaminants with the efficiency of recovery of the metal being reduced by these complexing species [22]. The treatment approaches for these complexes are performed by applying methods such as ion exchange [23], reverse osmosis [24], and/or nanofiltration. These techniques generate concentrated solutions from which the metal must be removed/recovered prior to disposal. The alternative treatment method includes breaking the metal organic complex into free metal and free chelating agent, followed by separation of the metal in an insoluble form with the organic agent discharged for subsequent treatment. In this approach, breaking the metal-reagent bonds requires chemical or another form of energy being input into the system. Methods used to degrade organics incorporated with metals include catalytic decomposition in photolytic cell in the presence of photoactive species of $TiO_2$ or $H_2O_2$, with pH adjustment [25]. But, the addition of chemicals as oxidants is highly disadvantageous in the production of dangerous material, which complicates the treatment process [26]. For example, early research concerning liquid wastes containing metal chelate compounds, Seiji Katoh in a patent (patent EP0168752 A2 issued on Jan. 22, 1986; [27]) use pH adjustment, adding iron polysulfate to form an iron chelate compound, which is subsequently removed by flocculation; the metal is later separated via precipitation at high pH.

Other researchers have used similar approaches, but attempted to reduce the usage of aggressive and hazardous chemical substances such as acids and bases. Kukec Leander et al. proposed a method to treat industrial effluent containing metals employing the coagulation/flocculation principles. See WO 2013/144664. They used a specially prepared gelatinous material to replace the use of Fe or Al ions as flocculants. By subsequent sedimentation in the sedimentation tank, impure and part of water is separated at the bottom from clean water. Treated water without the contamination and metals is located in the upper part of tank above the sediment, and may be discharged into the designated recipients for further treatment. However, metal needs to be reclaimed from the sediment. Generally the coagulation/flocculation system creates sludge, which will contain the removed pollutants that require further treatment or disposal. This is also true for electrocoagulating or electroflocculation systems where sacrificial iron or aluminium electrodes are employed to generate coagulants. Kaspar et al. [28] patented a process and apparatus for electrocoagulative treatment of industrial waste water employing sacrificial electrodes conjugated with foaming system to fluctuate pollutants. Some advance research has been performed to improve the performance of electrochemical coagulation/flocculation system by adding some other steps such as disinfection/oxidation with ozone, UV irradiation and ultrasonic treatment, as well as recirculation in the electromagnetic field to reduce or to treat the sludge [29].

See also Patent WO 2012076940 A1 [30] and WO 2003027029 A1 [31].

SUMMARY OF THE INVENTION

Disclosed herein is an effluent-treatment system and corresponding method. The system generally comprises three sequential electrochemical treatment units: an electro-oxidation (EO) unit, an electro-deposition (ED) unit, and an electro-adsorption (EA). These units can be operated in a modular fashion, independently or in any sub-combination of the three units, to remediate effluents containing organic metal complexes and/or inorganic metal complexes. Typically, these effluents take the form of industrial wastewater streams from various processes, e.g., metal coating, finishing, quenching, leaching, etching, stripping, textile effluents, chemical industries effluents, drilling and mining wastes (e.g., hydraulic fracturing or "fracking"), and the like. These waste streams often contain low to middling concentrations of metals, both toxic, non-toxic, and unknown. The system and method disclosed herein are also suitable to treat wastewater from food, chemical, pharmaceutical, textile, pulp and paper processing industries which primarily contains organic pollutants. The novelty of the system is the incorporation of the initial EO treatment, which breaks the strong metal complex bonding. This initial bond-breaking step facilitates subsequent ED treatment in which the metal component can be recovered. EO also creates active sites on organic and inorganic species and partially decomposes them such that they are quickly and completely eliminated during the EA treatment. Further, a concentrating cathode housed inside the ED cell helps in the recovery of metals, which are thus made available in a reusable form. Also, it is feasible (both technically and economically) to recover individual metals present in a mixed-metal effluent. The treated water is low in chemical oxygen demand (COD), biochemical oxygen demand (BOD), total nitrogen (TN), and chlorinated organic compounds (COC), and hence can be reused for industrial applications. The system and method, in addition to being effective for metal recovery and water recycling, is also energy efficient and environmentally friendly as only a few added chemicals, if any, are used (e.g., NaCl during EO treatment). There is also no need for pH adjustment for metal removal using the ED unit. Therefore, this combined system affords existing "end-of-pipe" treatment plants to address recalcitrant effluents containing organometallic and/or inorganometallic wastes.

Thus, disclosed herein is a method to remediate a liquid waste stream. The method comprises: (a) subjecting a waste stream to electro-oxidation; and then (b) subjecting the waste stream from step (a) to a further treatment selected from the group consisting of electro-deposition and/or electro-adsorption. Step (a) may optionally further comprise adding a salt to the waste stream prior to electro-oxidation. The salt may optionally comprise NaCl, KCl, $MgCl_2$, $CaCl_2$, and the like.

Optionally, the electro-deposition of step (b) includes performing the electro-deposition in the presence of a concentrating cathode which concentrates metal ions and metal-containing ions present in the waste stream.

Step (b) as noted above may option comprise subjecting the waste stream to electro-deposition and then to electro-adsorption. The electro-oxidation step, the electro-deposition step and the electro-adsorption step may optionally be conducted in separate chambers.

In another version, the method comprises (a) subjecting a waste stream to electro-oxidation; and then (b) subjecting the waste stream from step (a) to electro-deposition; and then (c) subjecting the waste stream from step (b) to electro-adsorption. As in the first version of the method, this second version optionally comprises adding a salt (such as NaCl, KCl, $MgCl_2$, $CaCl_2$, and the like) to the waste stream prior to electro-oxidation. The electro-deposition of step (b) optionally includes performing the electro-deposition in the presence of a concentrating cathode which concentrates metal ions and metal-containing ions present in the waste stream. The concentrating cathode optionally comprises an ion exchange resin in general and a cation exchange resin in particular.

Also disclosed herein is a system to remediate a liquid waste stream. The system comprises an electro-oxidation chamber, operationally linked to an electro-deposition chamber, operationally linked to an electro-adsorption chamber. The term "operationally linked" denotes a conduit or fluid connection by which the waste stream being treated can be selectively transferred between the various chambers. The chambers, however, do not have to be directly connected to one another in order to be "operationally connected." There may optionally be intervening structures such as pumps, mixers, holding tanks, separating tanks, defoaming tanks, etc. between the recited, operationally connected chambers.

Optionally, a reservoir may be operationally linked to at least one of the electro-oxidation chamber, the electro-deposition chamber, or the electro-adsorption chamber. The system may also optionally comprise a reservoir and a selective conduit that operationally and selectively links the reservoir to the electro-oxidation chamber, the electro-deposition chamber, and the electro-adsorption chamber, or any sub-combination thereof.

Each of the electro-oxidation chamber, the electro-deposition chamber, and the electro-adsorption chamber comprises a primary anode and a primary cathode, described below. The electro-deposition chamber may optionally further comprise, in addition to the primary cathode, a concentrating cathode.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. That is "a" and "an" as used in the specification and claims mean "one or more," unless clearly specified as being limited to one (1).

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the method described herein, as well as any additional or optional ingredients, components, or limitations described herein or otherwise useful in the given context.

BRIEF DESCRIPTION OF THE DRAWINGS

FIGS. 1A and 1B: (1)=anode; (2)=ion exchange resin packed in porous pouch; (3)=cathode, and (4)=exchangeable ions.

DETAILED DESCRIPTION

Figures 1A, 1B:
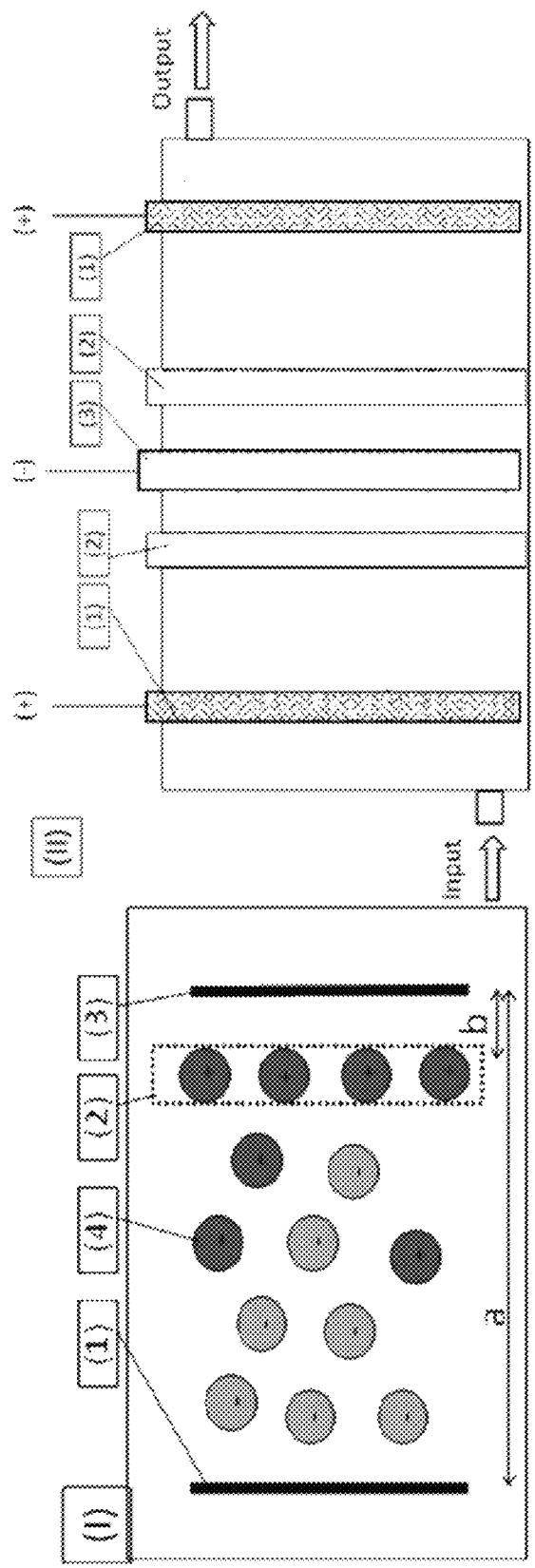
FIG. 1A is a schematic diagram depicting concentrator material placed near a cathode in an electrochemical cell acts as a concentrating cathode and reduces the effective distance of ion transport from distance "a" to distance "b".
FIG. 1B is a schematic diagram depicting fluid flow through the concentrating medium. In both

Treatment Procedure:

Effluents containing contaminants of certain persistent organic, metal, or both organics and metals in combination are resistant to environmental degradation through typical chemical, biological, and photolytic processes. These effluent streams emanate from a wide range of industries such as electroplating, metal finishing, quenching, scrubbing, dyeing, chemical etching, stripping, electronics, catalysts, batteries, hydraulic fracturing, mining, etc. Remediation of these effluent streams is challenging not only because of the organic pollutants forming complexes with the metal ions, but also due to the relatively low levels of metal ions present.

Given the large quantities of metals that are discharged in industrial effluents and the associated volumes of contaminated water, it is believed that the best water remediation strategy must incorporate systems to recover and reuse the metal and water streams. The remediation system should also be viable and sustainable, both economically and environmentally. The present system advantageously combines three electrochemical treatment units, typically sequentially as listed but also in any order: 1) electro-oxidation (EO), 2) electro-deposition (ED), and 3) electro-adsorption (EA).

The problems associated with complexing pollutants present in effluents is overcome in the present approach by pre-treating the effluents with anodic oxidation in an EO cell. Here, the metal complexes (both organic and inorganic) are degraded, thereby releasing free metal ions and chelating agents. This simultaneously creates active sites on the organic species making them amenable for subsequent remediation. The issues relating to the dilute nature of metals in effluents is addressed by using a concentrating cathode. The basic concept of the concentrating cathode is to capture metal ions on a concentrator medium located in close proximity to a cathode and positioned such that the effluent has to pass through the concentrator medium. The positively charged metal ions move towards cathode under the driving force of an electric potential and the flow of the effluent fluid. Immediately after metal capture on the concentrating cathode material, and due to the continuous generation of hydronium ions at the anode surface, concentrating cathode material is continuously regenerated by releasing metal ions into a small volume of electrolyte close to the cathode. This improves the efficiency of the relevant cathodic reduction process. In the EA cell, the remaining chelating organic and inorganic materials are remediated and the water stream is rendered clear making it suitable for reuse and/or for other industrial purposes, thus closing the water cycle.

Description of the Electrochemical Oxidation (EO) Process:

Electrochemical oxidation is a method for treating various organic effluents [32]. Generally, in an electrochemical cell, pollutants undergo direct or indirect anodic oxidation. Direct anodic oxidation involves the formation and adsorption of hydroxyl radicals at the anode surface (M) (Equation 1) [33], which enhances the direct oxidation of the organic pollutants (R) at the electrode surface (Equation 2). Indirect oxidation mechanisms involve attacking the pollutant molecules by several oxidizing species that form under the electrolysis conditions within the bulk solution [34, 35].

$$H_2O + M \rightarrow M[OH.] + H^+ + e^- \qquad [1]$$

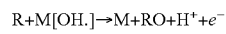

$$R + M[OH.] \rightarrow M + RO + H^+ + e^- \qquad [2]$$

Electrolysis of a solution containing chloride results in the formation of other species, including oxidants such as $Cl_2$, $ClO_2$, $O_3$, $OH\cdot$, $O\cdot$, $H_2O_2$, $O_2$, $H_2$, and $CO_2$ [34]. These oxidants integrate into the system to form intermediate and final products. Reaction at the anode and cathode in the presence of NaCl in an electrochemical cell may include:

Cathode $$2H_2O + 2e^- \rightarrow H_2 \uparrow 2OH^- \quad [3]$$

$$OCl^- + H_2O + 2e^- \rightarrow Cl^- + 2OH^- \quad [4]$$

Anode $$2H_2O \rightarrow O_2 + 4H^+ 4e^- \quad [5]$$

$$2Cl^- \rightarrow Cl_2 + 2e^- \quad [6]$$

$$6HOCl + 3H_2O \rightarrow 2ClO_3^- + 4Cl^- + 1.5O_2 + 6e^- \quad [7]$$

$$Cl_2 + H_2O \rightarrow HOCl + H^+ + Cl^- \quad [8]$$

$$HOCl \rightarrow H^+ + OCl^- \quad [9]$$

Anodic in Alkaline Medium $$ClO^+ + 2OH^- \rightarrow ClO_2^- + H_2O + 2e^- \quad [10]$$

$$ClO2^- + 2OH^- \rightarrow ClO_3^- + H_2O + 2e^- \quad [11]$$

Numerous EO treatment approaches for organic pollutants and evidence of the formation of oxidative sites have been reported [36, 37]. For instance, the formation of active oxidized chlorinated species of leuco dye molecules by applying anodic oxidation for treating dye solutions of methylene blue in the presence of NaCl as an electrolyte has been reported [18]. Elimination of chlorinated products in situ using an EA unit has also been reported [37].

Herein, organic pollutants resistant to adsorption processes are partially oxidized using EO to create active side groups on the molecule, which renders them suitable for subsequent adsorption and removal using the EA unit. Similarly, for effluents containing both metals and organic pollutants, i.e., Cu-EDTA complex and Cu-gluconate effluent, we found that EO helps to break the bond between the metal and the organic complexing reagents. This frees the metal ions and enhances the ion exchange process in the subsequent ED cell coupled with a concentrating cathode.

Description of Electrodeposition (ED) Cell with a Concentrating Cathode:

Electrolysis is an effective method for recovering and recycling metallic contaminants from effluent streams because it yields directly reusable metals that can be returned to the commercial cycle by melting or dissolving as an anode in electroplating. However, electrodeposition of metals from a dilute stream (<1 g/L) is problematic. This is often due to low mass transfer rate for ions in dilute solutions. The methods to enhance the mass transfer rate generally involve agitation in combination with moderately high electrode surface area per unit electrode volume [38-40].

The present method improves deposition rates by concentrating metal ions in the electrolyte in an area close to the cathode surface. This was performed by housing a concentrator medium in close vicinity of the cathode surface. The concentrator medium effectively collects the metal ions from the bulk solution on the active sites and then releases these ions near the cathode surface, thus improving the condition of ion transfer and ultimately increasing the deposition rate [37, 41]. This principle is effective to concentrate nano-levels and micro-levels of ions.

FIGS. 1A and 1B illustrate the presence of concentrating cathode reducing the effective distance of ion transfer from "a" to "b" (FIG. 1A). This effectively creates a new cell with metal ions concentrated near the electrode surface, thereby increasing the metal deposition efficiency. Ion exchange resin may be used in the present method as a concentrator material. The ion exchange resin may be confined in a porous pouch or other suitably porous netting or material, which is placed next to, or entirely surrounding, the cathode (such as a titanium mesh cathode) within the electrolysis chamber. The electrodes within the cell positioned in such a fashion that the effluent has to flow through the concentrating cathode to enhance collection of metal ions and in-situ regeneration of the concentrating cathode material. See FIG. 1B. Depicted is a vertical cross-section in which the concentrator material is packed in a porous cylinder or in a similar manner that completely surrounds the cathode having smaller diameters. In this fashion, the input stream is forced into contact with the concentrator cathode as the stream passes from input (bottom left of FIG. 1B) to output (top right of FIG. 1B).

A host of suitable ion exchangers are available commercially. Many are based on cross-linked polystyrene beads that have been functionalized. For example, the Purolite® and Amberlyst®-brand resins are functionalized polystyrene-divinylbenzene copolymers with different surface properties and porosities. The functional group is generally of the sulphuric acid type. The Amberlyst®-brand resins are supplied as gellular or macro-reticular spherical beads. Amberlite®-brand resins are also supplied in a great many configurations. Both are available from, for example, Sigma Aldrich (St. Louis, Mo., USA) (Amberlyst® and Amberlite® are registered trademarks of the Dow Chemical Co.) Similarly, Nafion®-brand resins are sulfonated tetrafluoroethylene-based fluoropolymer-copolymers which are solid acid catalysts. Nafion® is a registered trademark of E.I. du Pont de Nemours & Co.) The ion exchanger used in the examples was "UltraClean" brand resin, catalog no. UCW9126, from (Purolite Corporation, Bala Cynwyd, Pa., USA). This particular resin is a cation exchanger having a 0.57-0.65 mm granule size.

Figure 2:
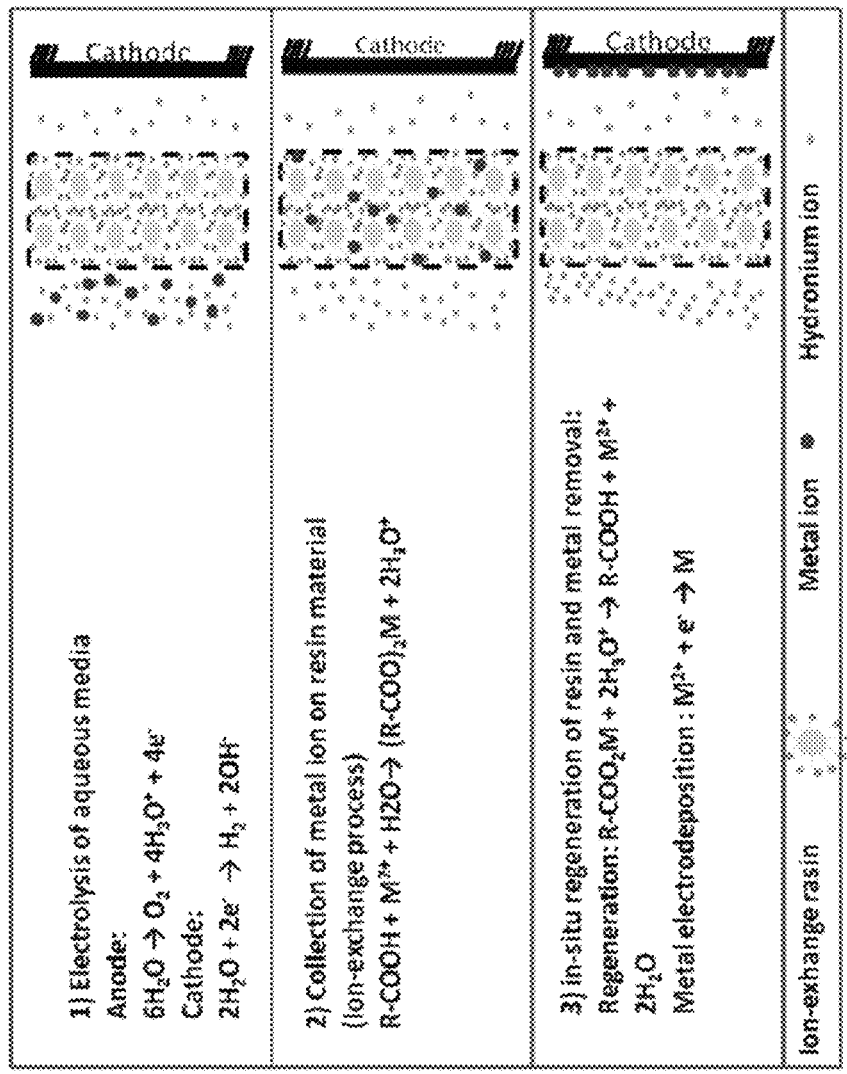
FIG. 2 is a schematic diagram demonstrating the principle of a concentrator electrode. Various types of electrodes may be used, including titanium mesh electrode, titanium mesh covered with activated carbon cloth as concentrator media, titanium mesh electrode surrounded by two ion exchange resin pockets as concentrator, and the like. The diagram schematically illustrates (1) electrolysis of aqueous media; (2) collection of metal ions on concentrator material; and (3) in situ regeneration of the concentrator and removal of the collected metal.

The process of metal removal and in-situ regeneration of the concentrating cathode material in the current method and system is illustrated schematically in FIG. 2 as three simultaneously occurring steps.

During the electrolytic process (FIG. 2, top panel), reduction of metal ions and water occurs on the cathode surface along with oxidation of water and other anions on the anode surface. The oxidation of water on the anode surface releases $H^+$ ions and the concomitant production of hydronium ions ($H_3O^+$), which affords in-situ regeneration of the concentrating cathode material. For example, using cation exchange resin for the concentrating cathode material, when the cell is loaded with metal ions, regeneration occurs by passing acid solution through the resin bed. However, in the electrochemical cell, acid will be produced during the continuous electrolytic oxidation of water that takes place at the anode surface forming $H_3O^+$ as explained in the Reactions 12, 13, and 14.

$$\text{Cathode } M^{2+} + 2e^- \rightarrow M \quad [12]$$

$$2H_2O + 2e^- \rightarrow H_2 + 2OH^- \quad [13]$$

$$\text{Anode } 6H_2O \rightarrow O_2 + 4H_3O^+ + 4e^- \quad [14]$$

During the initial stages of the reaction, a high concentration of metal ions is present. These metal ions will move towards the cathode surface under the influence of both the electric field and fluid flow within the electrochemical cell. The cell is designed to guide the fluid flow to pass through the concentrating cathode material before reaching the cathode surface. Therefore the metal ions are exchanged with the hydrogen ions on the ion exchange active side and concentrated on the concentrating cathode material. FIG. 2; middle panel. At the same time, the oxidation of water takes place with the production of $H_3O^+$ ions, which will move towards the cathode surface and acts to replace the absorbed metal ions. FIG. 2; bottom panel. The release of the metal ions increases their concentration near the cathode surface which increases the deposition efficiency.

Initiation: $R-COO^-H^+ + OH^+ \rightarrow R-COO^- + H_2O$ [15]

Absorption: $R-COO^- + M^+ \rightarrow R-COO^-M^+$ [16]

Regeneration: $R-COO^-M^+ + H^+ \rightarrow R-COO^-H^+ + M^+$ [17]

Wherein $R-COO^-$ represents exchange molecules on the ion exchange resin, and $M^+$ the metal ions.

Preliminary data obtained using the concentrating cathode confirm very rapid removal of electrochemically-depositable metal ions from dilute solution as compared to data obtained from a bare cathode without a concentrating cathode. The presence of organic species or complexes with metal ions may result in the alteration of the charge of the metal. Complexes and chelates often haves low or no efficiency to exchange at the concentrator media (e.g., cation exchange resins). Thus the presence of organic species retards the removal rate of metallic ions. This was evidenced from preliminary attempts to treat simulated industrial galvanic copper coating solution. Thus to maximize removal of the metal, a mechanism (EO) has to be used to free metal ions from their bonding within complexes. This is performed in the EO unit to break the bond between metal and complexing reagent. This results in freeing the metal ion and enhancing the ion exchange process at the concentrating cathode.

Description of Electroadsorption (EA) Cell:

Adsorption is commonly used to remove dilute toxicants from effluents. Since the intermediates or by-products from the EO cell, particularly the chlorinated compounds, may be more harmful to the aqueous environment than the original pollutant molecules from which they are formed, it is necessary to eliminate these products safely and preferably in situ. This is done in the EA unit by means of adsorbent particles under an applied electric filed. Any suitable adsorbent particle, now known or developed in the future, may be used. Activated carbon, for example, is suitable. Silica, alumina, zeolites and a host of other adsorbent particles are known in the art. Adsorbents are usually in the form of spherical pellets, rods, moldings, or monoliths with a hydrodynamic radius between about 0.25 and about 5 mm. (Adsorbents smaller or larger than this range may also be used.) Adsorbents typically have high abrasion resistance, high thermal stability and small pore diameters, which results in higher exposed surface area and hence high capacity for adsorption. Most industrial adsorbents fall into one of three classes, all of which are suitable in the present method: Oxygen-containing compounds: these are typically hydrophilic and polar, including materials such as silica gel, alumina gel, and zeolites. Carbon-based compounds: these are typically hydrophobic and non-polar, including materials such as activated carbon and graphite. Polymer-based compounds: these polar or non-polar functional groups in a porous polymer matrix.

Figure 3:
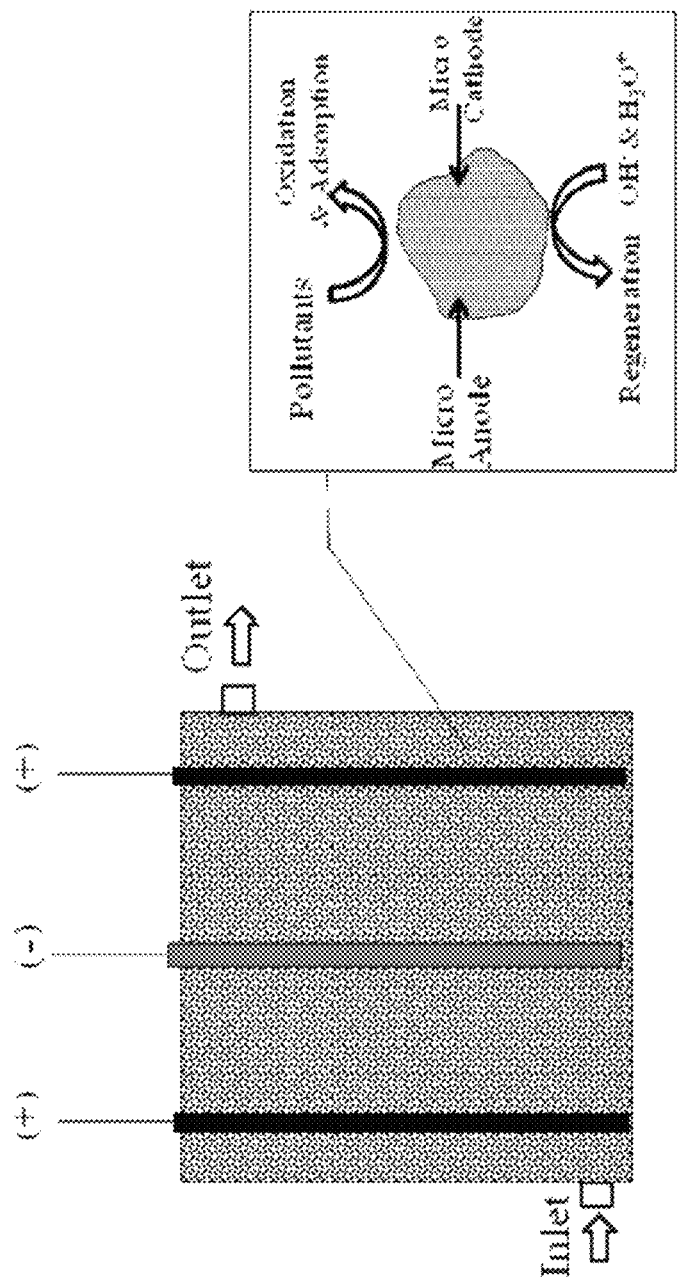
FIG. 3A is a schematic diagram of an electro-adsorption (EA) unit, demonstrating the polarization effect of an applied electric field on the adsorbent particles.
FIG. 3B is a schematic diagram illustrating the simultaneous oxidation, adsorption, and regeneration processes that occur on the adsorbent particles.

The present system is not only helpful in enhancing the adsorption property of the adsorbent but also in increasing oxidation via a mechanism that involves the creation of a bipolar field on the adsorbent particles. Thus, the adsorbent particles placed within the electric field form micro-anodes and micro-cathodes at their two extremities. See FIGS. 3A and 3B. This results in a large number of micro-electrolytic cells. For example, when using activated carbon granules as adsorbents, the graphite particles become such microelectrodes. The effective number of cells created will enhance the adsorption properties and at the same time destroy pollutants [37, 42, 43].

A system incorporating adsorbing particles placed within an electric filed has recently been described as a three-dimensional (3D) electrochemical system [44]. This system was reportedly effective for wastewater treatment when compared to two-dimensional (2D) electrochemical processes.

The preliminary results obtained using the current EA system to remove organic pollutants such as dyes, show very high removal rate of material and color [37]. However, if the adsorption capacity of pollutants on the activated carbon is already low because of the nature or the lack of active sites on the adsorbent itself and the adsorbed materials, the presence of electric field will not yield so great an increase in the capacity of adsorption. Thus treatment of effluents using EA unit alone is likely not suitable for the destruction of pollutants. Thus, pre-treatment of the effluent by EO unit creates active sites on the pollutant molecules.

Overall Operation:

The preferred sequence of electrochemical treatment for effluents containing organic and metals in the present method and system is: EO, ED, then EA. Pre-oxidation in the EO unit prior ED unit or EA unit, will enhance the metal deposition and organic remediation. For instance, if applying ED system without pre-treatment with an EO unit, metal-complexes present in the effluent will have low affinity to the active sites at the concentrating cathode and the process of metal removal will be slow. Metal complexes that have negative or neutral charge will not effectively exchange at the concentrating cathode (e.g., cation exchange resins) in the absence of EO. Similarly, using the ED without the concentrating cathode will slow down the removal process. The process will still function from a technical point of view, but would likely prove too slow to be economically viable. In the case of treating effluents that do not contain metals or contain metals not amenable to electrochemical deposition, the ED unit is unnecessary and can be omitted.

Applying the EA unit without pre-EO treatment for effluent containing resistant organic pollutants which have no affinity to adsorb on adsorbents will result in slow remediation. Again, the process will remain technically feasible, but in some cases the remediation will be too slow to be economically feasible.

The EA unit is designed to remove organic and inorganic species (e.g., $Cl^-$). However, in the case where metal ions are present during the EA treatment, metal ions be adsorbed effectively and removed from the effluent. Although pollutant metal ions will be removed, and using this approach is explicitly within the scope of the appended claims, this approach is not economically preferred because it is difficult to re-activate the adsorbents in-situ. Once the adsorbent has been saturated with metals, it is typical that the adsorbent must be replaced, rather than regenerated. Due to the cost of the adsorbent, it is usually more economical to remove metals in the ED unit prior EA treatment.

The present system, in addition to being effective for metal recovery and water recycling, is also energy efficient and environmentally friendly. Very few, if any, added chemicals are used (e.g., NaCl during EO treatment). There is typically no need for pH adjustment for metal removal using ED unit, although pH adjustment (upward or downward) may be used if deemed advantageous for any particular effluent. The combined system affords existing "end-of-pipe" treatment plants to remediate high-strength, recalcitrant effluents containing metallic, organic, and organometallic wastes.

Experimental Set Up:

A batch-mode test reactor was constructed. The test reactor comprised a reservoir and three electrolytic chambers: one each for an EO, an ED, and an EA unit. All parts of the reactor were assembled using acrylic sheets. The electrolytic chambers of each unit contained two titanium mesh anodes coated with iridium oxide (dissolution resistant) on either side of the titanium mesh cathode. Different electrode sizes, coatings, and materials can be used as appropriate. The electrodes should be dissolution resistant to extend the operation life of each unit. The position of the electrodes was chosen in this specific instance so that they were approximately 30% less in height than the reactor upper edge to avoid spillage during fluidization of the effluent and for retaining any foam, if formed. The electrodes were positioned vertically and parallel to each other with an appropriate gap between them to obtain an anode-cathode-anode electrode sequence. The electrodes were connected with a power supply as a source for DC current. Any suitable power source such as batteries, fuel cells, storage cells, etc. can be employed. Electrolytic cells used as such with no modification will suffice for an EO unit. To make the electrolytic cell for the ED unit, an ion exchange resin was packed in a perforated Plexiglas bag and positioned so as to cover the cathode on both sides and to permit fluid to pass through the bag prior to reaching the cathode. To obtain the electrolytic cell for EA unit, activated carbon granules were added inside the cell to cover the surface of the electrodes, leaving about 30% of the electrolytic chamber not covered to avoid activated carbon flooding.

Figure 4:
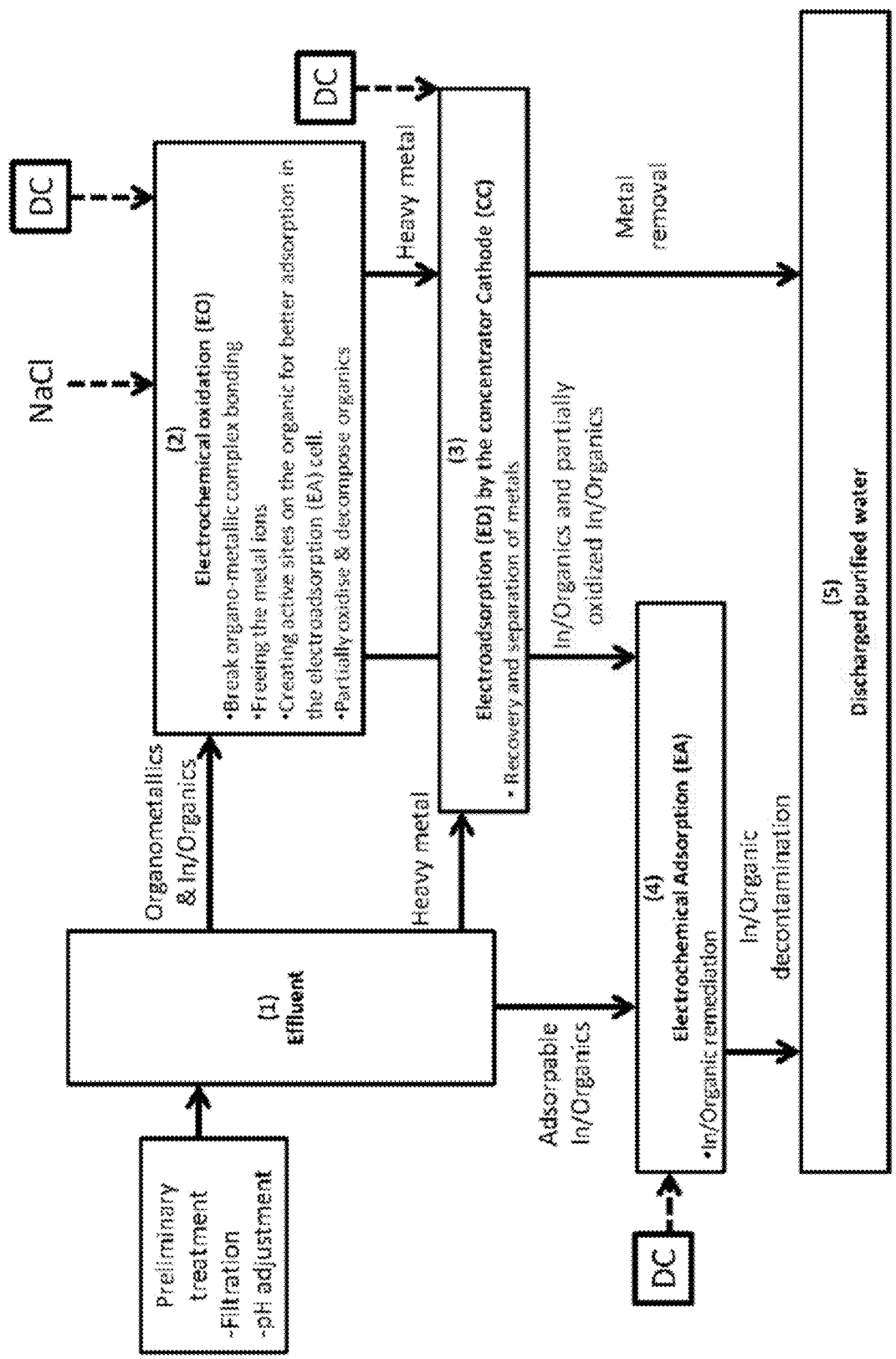
FIG. 4 is a schematic diagram of a version of the multi-component electrochemical treatment system for effluents containing metallics, organics, organometallics, and inorganic metallics as disclosed herein.
Figure 5:
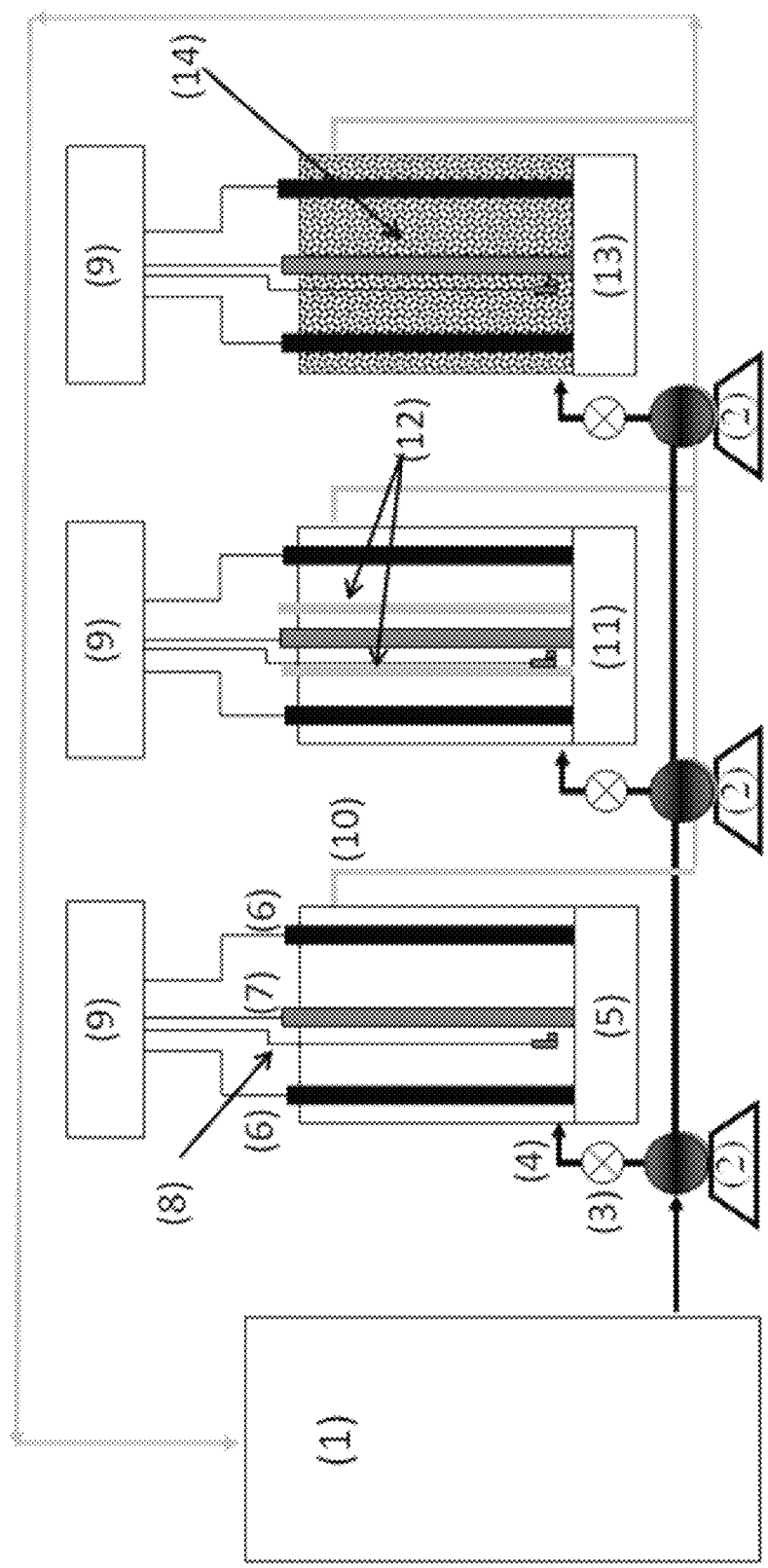
FIG. 5 is a schematic diagram of an illustrative apparatus for practicing the method. The apparatus contains the three sequential electrochemical treatment cells. The effluent circulates from reservoir (1) to electro-oxidation (EO) cell (5), electro-deposition (ED) cell (11) and electro-adsorption (EA) cell (13). The exemplary cells contain titanium mesh cathode (7) conjugated with anodes (6) of titanium mesh coated with mixed metal oxide. The cathode in ED cell is surrounded by concentrator media concentrating cathode (12). The EA cell (13) is filled with granulated activated charcoal (14). The reference electrode (8) is used to control the cathodic surface potential.

A typical electrochemical treatment process is depicted schematically in FIG. 4. The pre-treatment step (pH adjustment and filtration etc.) may be necessary for some limited applications. Another schematic of the system is presented in FIG. 5. It is important to note that the system operation can be optimized by regulating flow rates and residence times in each of the treatment units depending on the nature and/or the source of the pollutants.

EXAMPLES

The following examples are given by way of illustration of the present method therefore should not be construed to limit its scope. Furthermore, the system and method can be extended for the treatment of other wastewater types, particularly for treating aqueous effluent containing metals amenable to electrochemical deposition on an electrode, organic pollutants, and effluents containing metal complexes.

The pre-treatment process using an EO unit is essential. The following examples will demonstrate its importance. Three different effluent categories are exemplified: 1) Effluent containing metals, but no complexes, 2) Effluent containing metals with a complexing reagent, 3) Effluent containing persistent organic chemical residues.

Example 1

Treatment of Metal-Complex Simulated Effluent (Using EO, ED, and EA)

Different sets of samples prepared in lab containing copper as metal with organic impurities and a group of chemical residues was considered. The first set of solutions are simulated effluents contain copper at two different concentrations of 250 ppm and 1000 ppm. These are similar to effluent resulting, from galvanic copper-coating solution [45, 46]. Other samples were simulated effluents containing copper-EDTA complexes. The concentration of EDTA disodium salt was 0.0039 M and 0.0157 M to give Cu:EDTA ratio of 1:1 with 250 ppm and 1000 ppm Cu ions respectively. The operating parameters of the three electrochemical units are listed in Table 1. The physicochemical characteristics of these simulated effluents are presented in Table 2. The basic parameters used for treating these copper-containing effluents are presented in Table 2A.

TABLE 2

Characteristics of copper-containing effluents before treatment.

| Parameters | Sample ID | | | | |
|---|---|---|---|---|---|
| | A | B | C | D | F |
| Cu (ppm) | 250 | 250 | 1000 | 250 | 1000 |
| Media | $HNO_3$ 0.05M | Sodium gluconate (30 g/L), and $K_2SO_4$ (10 g/L). | | $Na_2SO_4$, 1 g/L, EDTA disodium salt to give Cu:EDTA ratio of 1:1*. | |
| pH | 1.75 | 2.2 (adjusted using 1M $H_2SO_4$ or NaOH) | | 10 (adjusted using 1M $H_2SO_4$ or NaOH) | |
| NaCl (mol/L) | — | 0.05 | | 0.05 | |
| COD (ppm) | — | 3600 | | 68.5 | 271.7 |

*EDTA disodium salt 0.0039M and 0.0157M to give Cu:EDTA ratio of 1:1 with 250 ppm and 1000 ppm Cu ions respectively NaCl was added to all samples solutions to yield a concentration 0.05 M. The salt functions as an electrolyte to induce electrochemical oxidation. Any salt can be used; inorganic salts are preferred. The effluent is then transferred from the reservoir to the electrolysis chamber of EO unit for one hour then pumped from the EO unit to the EA unit for indicated period of time, applying a current density of 30 A $m^{-2}$.

After the expiration of the designed time, the EO unit was turned off and the per-treated effluent was pumped through reservoir into ED unit to start the metal removal process. The ED unit was designed with a concentrating cathode system containing a ion exchange resin to facilitate freed metal deposition on the cathode. To illustrate the efficiency of the system, a comparison was made first for metal removal from a solution in the presence or absence of complexing agents using the ED unit; then a comparison was made for metal removal from a solution containing complexing agent using the ED unit with and without pre-treatment using the EO unit.

TABLE 2A

Basic parameters used for treating copper-containing effluents prepared in lab

| Treatment unit | Parameter | Measurement | Unit of measurement |
|---|---|---|---|
| Uniform in all units | Total volume treated | 10 | L |
| | Electrodes type | 2 mesh | Ru—Ir coated Titanium anodes |
| | | 1 mesh | Titanium cathode |
| | Electrode diameter | 16.0 × 15.0 | cm |
| | Electrode surface area | 0.1 | $m^2$ |
| | Distance between electrodes | 3 | cm |
| | Flow rate | 8 | L $min^{-1}$ |
| | Voltage V1 | maximum | V |

TABLE 2A-continued

Basic parameters used for treating copper-containing effluents prepared in lab

| Treatment unit | Parameter | Measurement | Unit of measurement |
|---|---|---|---|
| EO unit | Time T1 | 1 | h |
| | Current 1 | 3 | A |
| | Cathodic current density 1 | 30 | A m$^{-2}$ |
| ED Unit | Time T2 | 8 | h |
| | Current 2 | 3 | A |
| | Cathodic current density 2 | 30 | A m$^{-2}$ |
| | concentrating cathode material | 0.57-0.65 mm granule size, cation exchange resin, UltraClean UCW9126 (Purolite, Bala Cynwyd, PA, USA) | |
| EA Unit | Time T3 | 2 | h |
| | Current 3 | 3 | A |
| | Cathodic current density 3 | 30 | A m$^{-2}$ |
| | Adsorbent | 1-3 mm granules size and 1690 g L$^{-1}$ density supplied from QFC-16 (Qualikems Fine Chemical, China) | |

Figure 6:
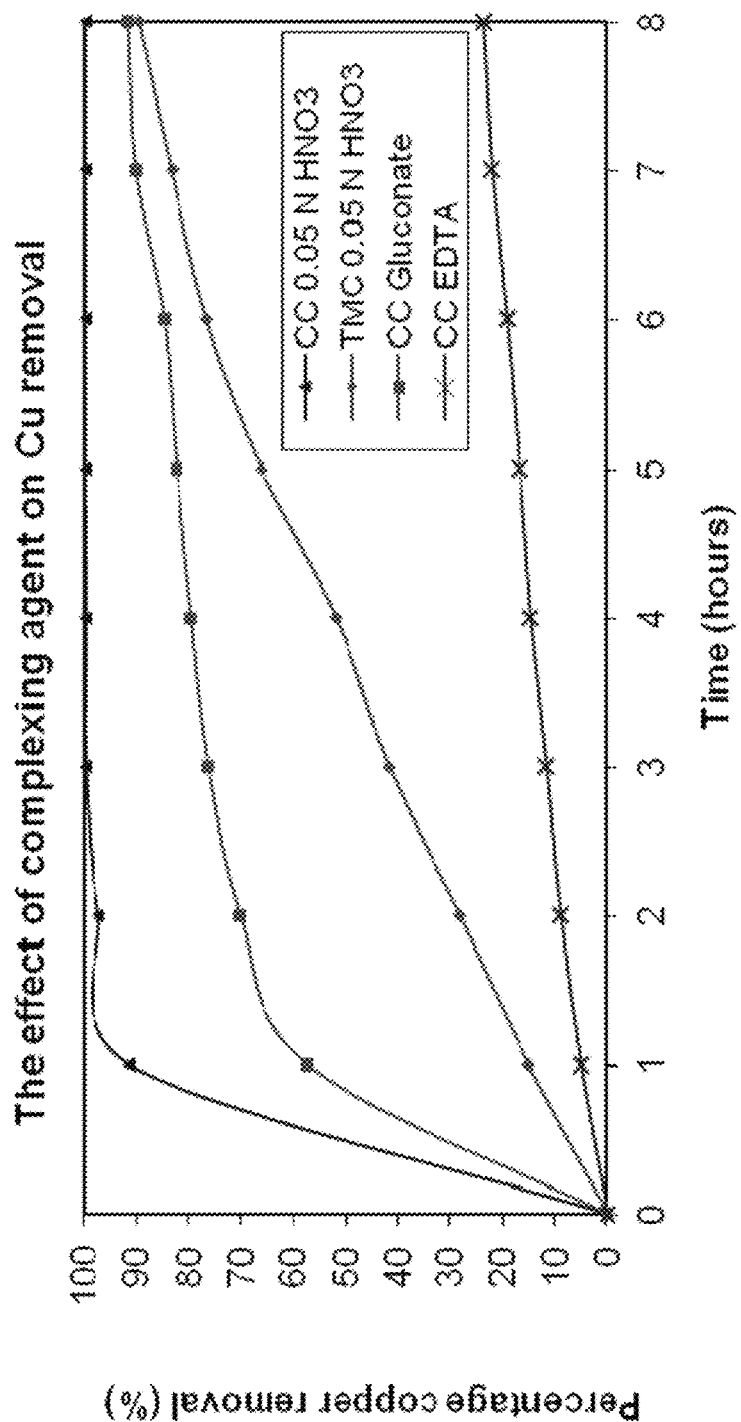
FIG. 6 is a graph depicting recovery of copper from 0.05 M $HNO_3$, gluconate, and EDTA solutions using concentrating cathode and using a conventional titanium mesh cathode (TMC). Experimental condition: Initial Cu concentration 250 ppm; EDTA disodium salt 0.0039 M to give Cu:EDTA ratio of 1:1 with 250 ppm Cu ions, sodium gluconate concentration 30 g/L, in the present of 10 g/L $K_2SO_4$; pH=2.2 (buffer 0.5 M $H_2SO_4$+1.0M NaOH) at current density of 40 $A/m^2$.

Removal of Metal Using ED Unit from Non-Complexing Media:

Data obtained using the concentrating cathode system in the ED unit (FIG. 6) confirms very rapid removal of Cu ions. By using a concentrating cathode in combination with a bare titanium mesh cathode (TMC) a removal rate of 91% within one (1) hour was achieved for 250 ppm Cu ions from a 0.05 M HNO$_3$ solution. Without the concentrating cathode, the removal rates were less than 28% for Cu. (Data not shown.) Similar results were obtained for recovery of Pb, Cd, Sn, Ni, and Co ions from dilute single metal or mixture effluents like those would be obtained from acidic leaching components of various acid media (e.g., nitric, sulphuric and acetic acid media). Data not shown.

Removal of Metal Using ED Unit from Complexed Media:

Data also show that the presence of organic species retards the removal rate of Cu ions, both when using a TMC along and when using a TMC in conjunction with a concentrating cathode. In this example, the removal of copper ions from solutions of gluconate and EDTA at different Cu levels using ED unit were slower due to the formation of Cu-gluconate, or Cu-EDTA complexes, respectively. The Cu-gluconate complex is neutrally charged, which reduces the mutual ion exchange properties between the metal ion itself and any concentrating cathode materials. EDTA, in contrast, will react with metal ions (M$^{n+}$) to form anionic-charged chelates (Equation 18) with stronger complex bonding at higher pH. The formation of anionic species hinders the ion exchange properties between the metal ion and cation exchange materials. The anionic species will preferably move toward the anode [9, 47] and hinder the removal of Cu ions when using the ED unit.

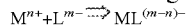 (18)

In these cases, it was found that EO in the presence of NaCl breaks the bond between the metal and the complexing organic reagent. This results in freeing the metal ion and enhancing the ion exchange process at the concentrating cathode.

Analysis of samples indicate that after 1 h of electrolysis using EO unit, the values of COD and the level of Cu for all solution were not showing much variation. The EO unit is designed to breaking metal-complex bonds by oxidants generated due to the application of electric potential between electrodes. This treatment results in freeing metal ions from complexes, thus creating conditions to exchange the freed metals with resin in the subsequent ED unit. Advance oxidation of complex bonding happens with assistance of chloride, chlorite, chlorate, hypochloride, chlorine, hydroxyl, oxygen, and hydrogen peroxide radicals or ions generated in situ during electrolysis reactions of chloride or water at anodes and cathode.

Figure 7A:
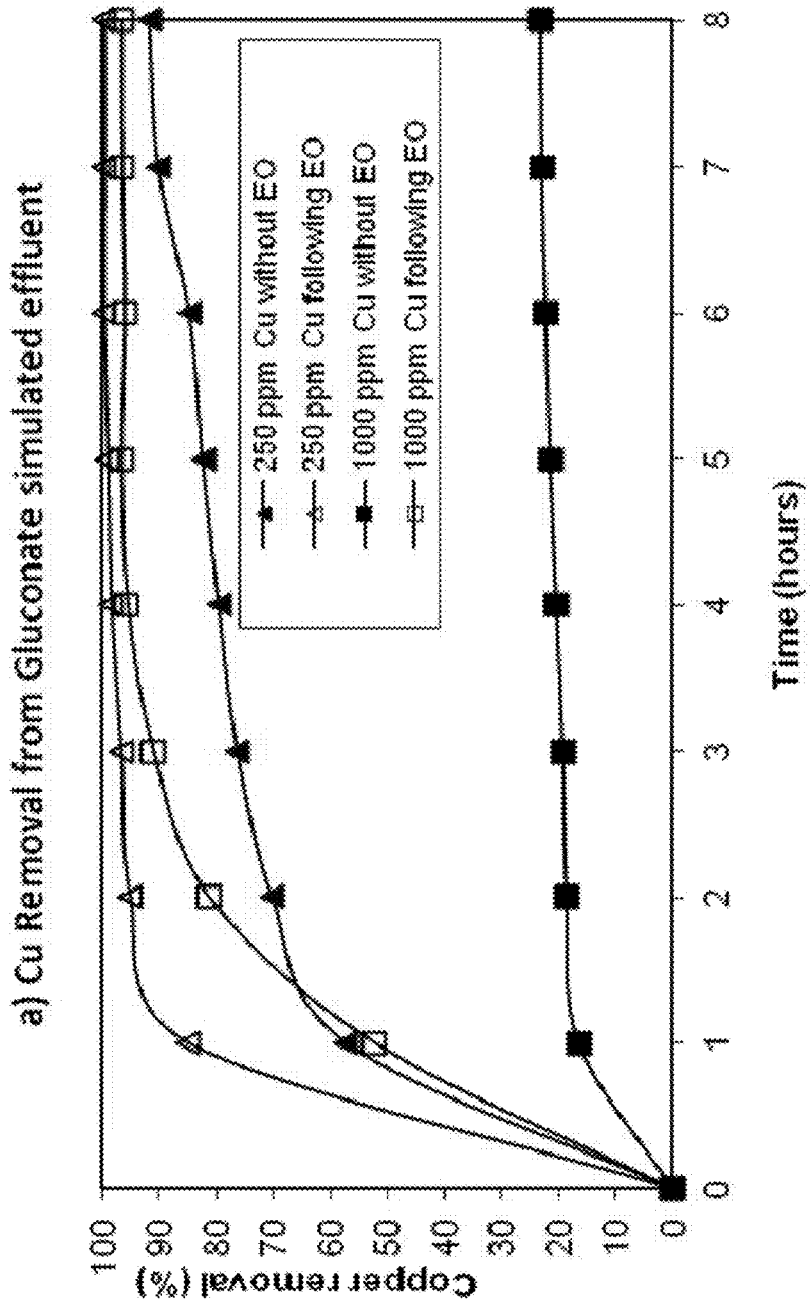
FIGS. 7A and 7B are graphs depicting copper recovery using concentrating cathode with and without EO pre-treatment from simulated gluconate coating effluent (FIG. 7A) and Cu-EDTA solution (FIG. 7B). Experimental conditions for both figures: Initial Cu concentration 250 ppm and 1000 ppm; EDTA disodium salt 0.0039 M and 0.0157 M to give Cu:EDTA ratio of 1:1 with 250 ppm and 1000 ppm Cu ions respectively; sodium glyconate concentration 30 g/L; in the presence of 10 g/L $K_2SO_4$; pH=2.2 (buffer 0.5 M $H_2SO_4$+1.0 M NaOH) at current density of 40 $A/m^2$. NaCl (0.1 M) used as electrolyte for one hour EO.
Figure 7B:
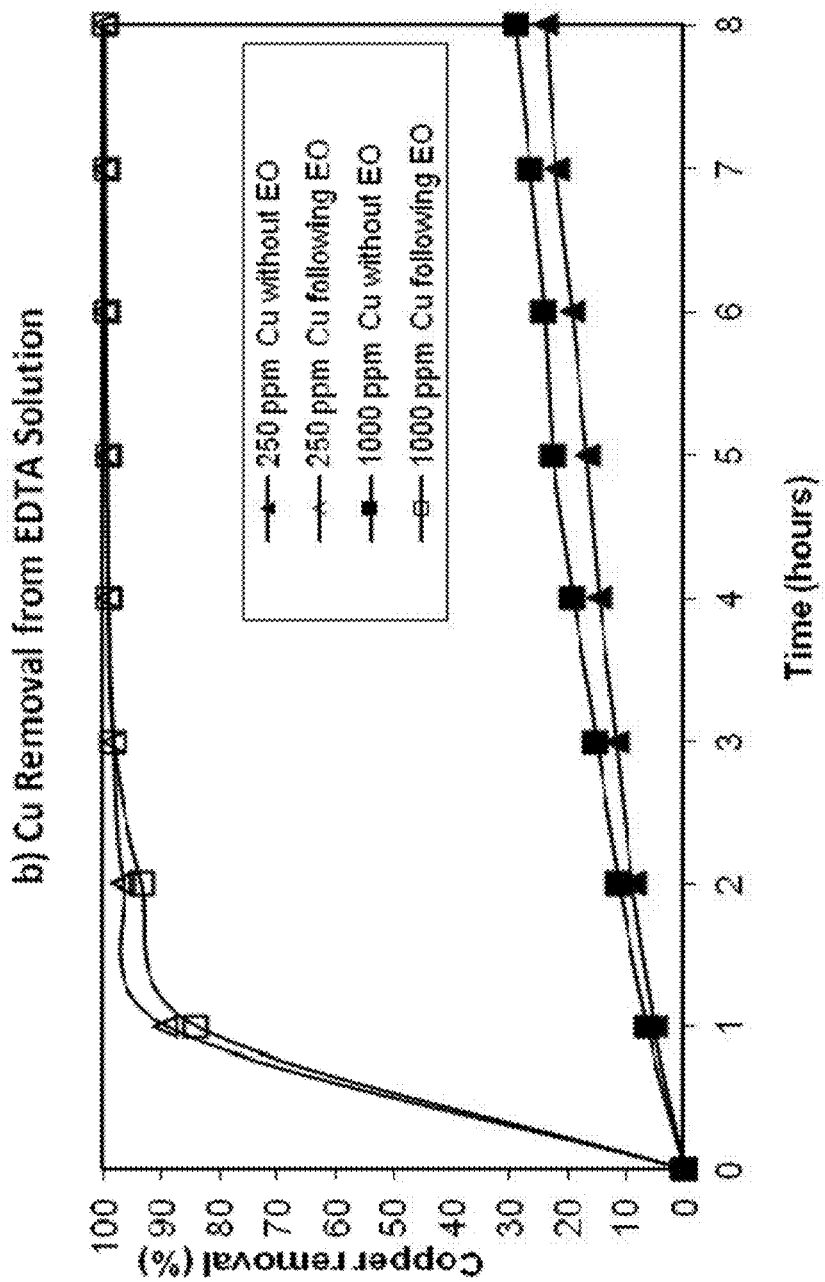

The data in FIGS. 7A and 7B show that Cu can be efficiently removed from both of simulated coating acidic Cu-gluconate effluent (FIG. 7A) and Cu-EDTA effluent (FIG. 7B) by electrodeposition using the concentrating cathode system following an 1 h of EO treatment using NaCl as an electrolyte. The removal rates of Cu from Cu-gluconate simulated effluents after 1 h in ED unit following 1 h pre-treatment using EO unit were 85.2% and 52.4%, respectively from 250 ppm and 1000 ppm solutions; however, without EO pre-treatment, the corresponding removal rates were 57.3% and 16.5%; see FIG. 7A). Considering Cu-EDTA, the system is highly effective with chloride addition. Metal removal, in contrast, was very slow using the ED unit without EO treatment. The generated active chlorine in EO unit allowed the decomplexation of Cu-EDTA. Then, by using the ED unit, the free metal ions were removed very fast by electrodeposition. The removal rates of Cu from Cu-EDTA solution after 1 h in ED unit following 1 h pre-treatment using EO unit were 89.4% and 84.1%, from 250 ppm and 1000 ppm solutions, respectively. The same system shows however, very low removal rate without EO treatment. The corresponding removal rates were 5.1% and 6.4%, respectively (FIG. 7B).

Performance of the EA Unit for Completing Agent Removal:

After metal removal using the ED unit, the remaining organic impurities were addressed in the EA unit. The level of COD indicates the extent of removal of organic compounds presence in the effluent. The values of COD after metal removal were nearly intact in all solutions with figures presented in Table 3.

After the ED unit was turned off, the pre-treated effluent was pumped through the reservoir into the EA unit to initiate COD removal. The effluent was transferred from the reservoir to the electrolysis chamber of EA unit, applying a current density of 30 A m$^{-2}$ for 2 h.

TABLE 3

COD values during EA treatment after EO and ED of copper-containing effluent. ppm (removal %)

| Time (min) | Sample | | | |
|---|---|---|---|---|
| | B | C | D | F |
| 0 (After EO and ED Treatments) | 3376 (0.0%) | 3424 (0.0%) | 59.6 (0.0%) | 254.9 (0.0%) |
| 15 | 80 (97.6%) | 160 (95.3%) | 31.4 (47.3%) | 142.5 (44.1%) |
| 30 | 48 (98.5%) | 64 (98.1%) | 18.9 (68.2%) | 62.7 (75.4%) |
| 60 | 48 (98.5%) | 32 (99.1%) | 12.4 (79.2%) | 32.6 (87.2%) |
| 120 | 48 (98.5%) | 32 (99.1%) | 9.5 (84.1%) | 10.8 (95.7%) |

Preliminary results obtained using the EA system to remediate both sample sets (Table 3) show good removal rate of COD. After 15 min of EA the COD values reached more than 95% with all samples, and almost total COD removal were completed after 1 h of electrolysis. The results show that treated water completely complies with the federal regulations required for treated water to be discharged to the environment. In the reactor chambers and at the first stage of EO unit, the only reagent added to the effluent stream was NaCl to improve the rate of the electrochemical oxidation.

Generally, in an electrochemical cell, pollutants undergo direct or indirect anodic oxidation. Direct anodic oxidation involves the formation and adsorption of hydroxyl radicals at the anode surface (M) (Equation 19) [33], which enhances the direct oxidation of the organic pollutants (R) at the electrode surface (Equation 20). However, indirect oxidation mechanisms involve attacking the pollutant molecules by several oxidizing species that form under the electrolysis conditions within the bulk solution [34, 35].

$$H_2O + M \rightarrow M[OH\cdot] + H^+ + e^- \quad [19]$$

$$R + M[OH\cdot] \rightarrow M + RO + H^+ + e^- \quad [20]$$

Furthermore, electrolysis of solution containing chloride will result in the formation of components e.g., $Cl_2$, $ClO_2$, $O_3$, $OH\cdot$, $O\cdot$, $H_2O_2$, $O_2$, $H_2$, and $CO_2$ [34], which will integrate into the system to form the intermediate and final products. Thus, exposure of effluent to anodic oxidation in the presence of chlorine-containing electrolyte may result in the formation of undesired toxic and/or hazardous reaction of organochlorine products, which will require additional treatment steps. For example, there is clear evidence for the formation of undesirable chlorinated materials during the EO treatment of wastewater containing organic compounds [18], moreover, it is also known that these harmful chlorinated products can be eliminated in situ using EA unit [37].

Therefore, the use of EO unit is important as a primary treatment to break metal-complexing bonds and prepare metal ions for electrodeposition. The potential formation of undesirable chlorinated materials is overcome by in situ elimination using the EA unit.

Example 2

Treatment of Textile Effluent (Using EO and EA)

Two textile effluent samples (Sample 1 and 2) containing colored organic impurities and group of chemical residues that result from a dye-house operation were considered. These effluents contain a variety of organic and inorganic species resulting from cotton fabric dye house and dye material used were classified by the dye house as reactive dye types. The physicochemical characteristics of these raw effluents are presented in Table 4. The effluents have high color intensity with moderate level of COD and total dissolved solids (TDS) and are considered as pollutants with levels higher than the allowable federal discharge limits. The $BOD_5$:COD ratio for both samples indicates that only 25% and 20% of the COD from Sample 1 and Sample 2 respectively, are degraded by typical biological treatment.

Because these samples do not contain metals, only EO and EA units were used. Initially, NaCl was dissolved in the effluent to make a concentration 0.03 M. The effluent was then transferred from the reservoir to the electrolysis chamber of either EO unit or EA unit, applying a current density of 30 A m$^{-2}$ for the specified time.

TABLE 4

Characteristics of dye-house effluent before treatment.

| Parameters | Sample 1 | Sample 2 |
|---|---|---|
| Color | Intense dark purple | Dark brown to red |
| pH | 9.55 | 10.22 |
| Conductivity (ms · cm$^{-1}$) | 15.03 | 42.500 |
| COD ppm | 1550 | 1615 |
| BOD$_5$ ppm | 393 | 321 |
| TDS ppm | 5738 | 6971 |
| BOD$_5$:COD | 0.25 | 0.20 |

Preliminary results obtained from circulating effluent through the EA system with no current input for 2 h and monitoring the COD values (Table 5), show relatively low COD removal of 59.2% and 20.3% for Samples 1 and 2, respectively. After discharging the effluent, fresh effluent of Sample 1 was pumped for second 2-h run; this was repeated for a third run. Still, the removal rate was relatively low: 26.2% and 16.3% respectively. These results indicate that the activated carbon could be saturated by pollutants present in the effluent. Using the same unit, by applying 30 A m$^{-2}$ current density, good removal rates of COD and color were achieved (Table 6). Removal rates after 2 h of EA were 97.3% and 87.6% for samples 1 and 2, respectively. Discharging the effluent and replacing it with fresh one, the efficiency of the system for COD removal showed a decrease with the increasing run time. The visible color of the samples, the spectra, and the COD values show no improvement with increasing run time, which indicate that the EA system is rather inefficient with time while repeating the treatment process. These results indicate that, the remediation process may take longer with more pollutants loading using the EA unit.

TABLE 5

COD values for textile sample solutions during treatment using the EA unit with no current input. ppm (removal %)

| Time (min) | Sample 1 | | | Sample 2 |
|---|---|---|---|---|
| | First run | Second run | Third run | |
| 0 | 1615 | | | 1550 |
| 15 | 1361 (15.7%) | 1485 (8.1%) | 1590 (1.6%) | 1427 (7.9%) |
| 30 | 1065 (34.1%) | 1365 (15.5%) | 1513 (6.3%) | 1356 (12.5%) |
| 60 | 748 (53.7%) | 1297 (19.7%) | 1439 (10.9%) | 1292 (16.6%) |
| 120 | 658 (59.2%) | 1192 (26.2%) | 1352 (16.3%) | 1235 (20.3%) |

TABLE 6

COD values (ppm) for textile sample solutions during treatment using the EA unit with current input.

| Time | Sample 1 | | | | |
|---|---|---|---|---|---|
| (min) | Run 1 | Run 2 | Run 4 | Run 6 | Run 8 |
| 0 | | | 1615 | | |
| 15 | 624 (61.3%) | 752 (53.4%) | 869 (46.2%) | 1268 (21.5%) | 1416 (12.3%) |
| 30 | 284 (82.4%) | 348 (78.4%) | 419 (74.1%) | 947 (41.4%) | 1074 (33.5%) |
| 60 | 176 (89.1%) | 212 (86.8%) | 331 (79.5%) | 682 (57.8%) | 785 (51.4%) |
| 120 | 42 (97.3%) | 40 (97.5%) | 78 (95.2%) | 189 (88.3%) | 242 (85.1%) |

| | Sample 2 | | | | |
|---|---|---|---|---|---|
| | Run 1 | Run 2 | Run 3 | Run 4 | Run 5 |
| 0 | | | 1550 | | |
| 15 | 865 (44.2%) | 98.8 (36.3%) | 1124 (27.5%) | 1231 (20.6%) | 1295 (16.5%) |
| 30 | 382 (75.3%) | 457 (70.5%) | 758 (51.1%) | 794 (48.8%) | 827 (46.6%) |
| 60 | 247 (84.1%) | 361 (76.8%) | 476 (69.3%) | 489 (68.5%) | 537 (65.4%) |
| 120 | 193 (87.6%) | 273 (82.4%) | 391 (74.8%) | 428 (72.4%) | 468 (69.8%) |

Generally, effluents containing reactive dyes are difficult to treat by adsorption. This may be due to the lack of affinity between the active sites at both adsorbent and dye materials. Furthermore, if the adsorption capacity of pollutants on the activated carbon is already low because of the nature or the lack of active sites, the presence of electric field will not greatly alter the capacity for adsorption. In this case, effective method is the one that creates active sites. To overcome this problem, pre-treatment of the effluent by EO system can be performed on the pollutant molecules prior to EA.

Figure 8A:
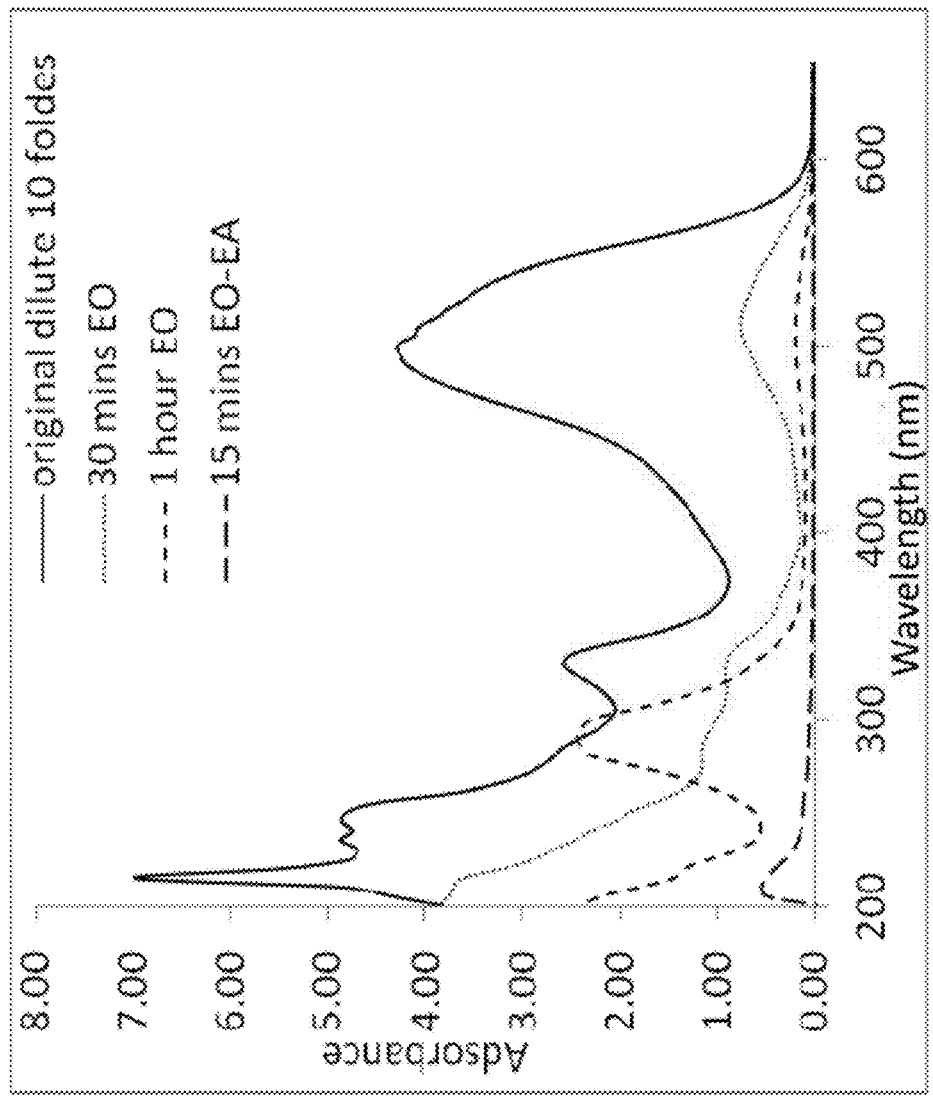
FIGS. 8A and 8B are UV-Vis spectra of textile sample solution 1 (FIG. 8A) and textile sample solution 2 (FIG. 8B) during various EO/EA treatments (as noted in the figures).
Figure 8B:
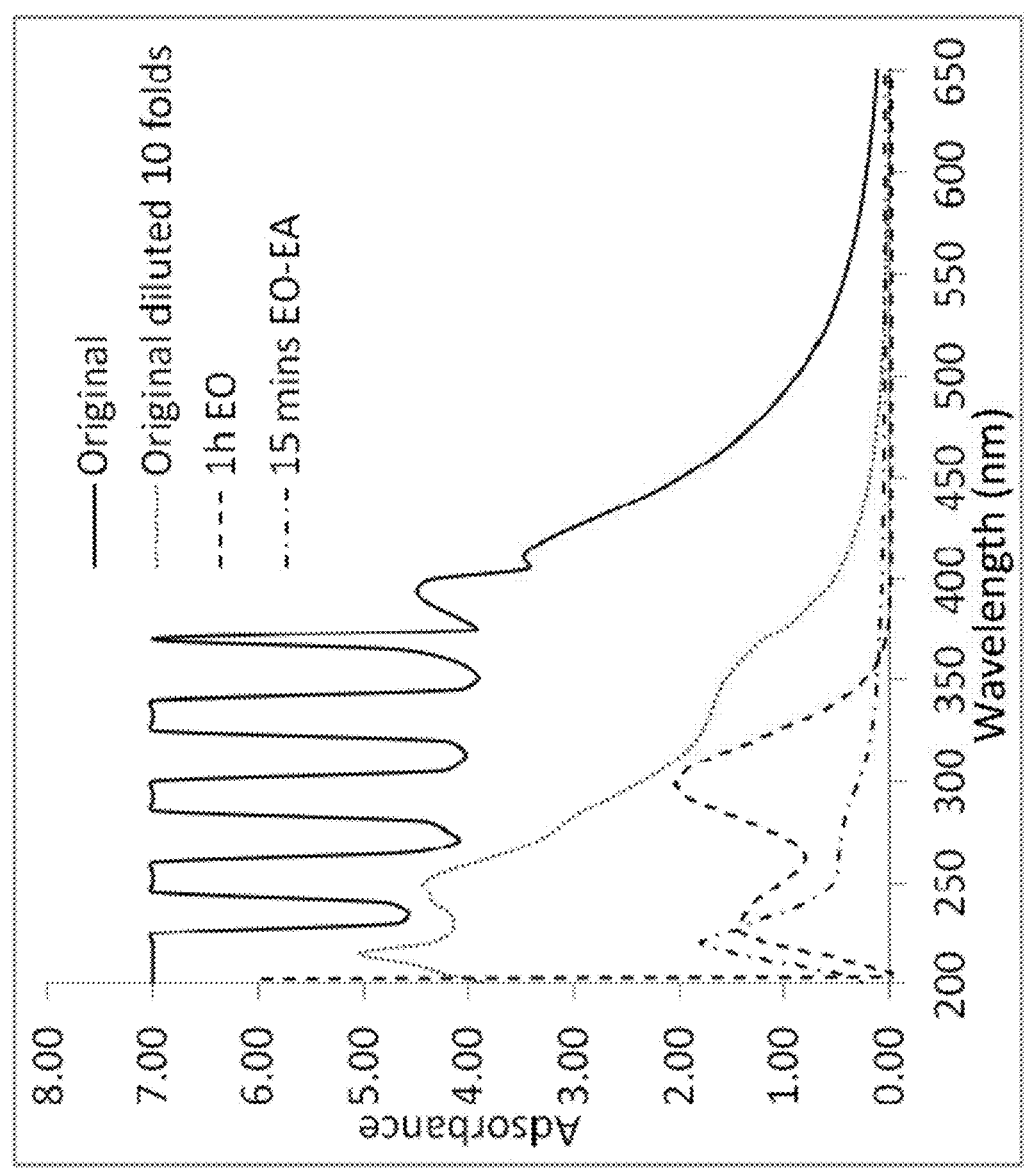

Electrolysis of both sample solution using EO system resulted in the formation of an additional UV peak for both dye effluents at 300 nm, FIGS. 8A and 8B, which indicates the formation of reactive hypochlorite radicals [48, 49] and intermediates [18]. Subjecting the resulting solution to electrolysis in the EA cell, results in the complete disappearance of the additional peak after 15 min of electrolysis. The COD values (Table 7) during the EO are reduced slowly and subjecting the resulting solution to electrolysis in the EA system leads to further decrease in COD.

These results prove that a combination of electrolysis with an adsorption step effectively destroys organic pollutants, but for more efficiency with material has low affinity to adsorbent it was necessary to use EO prior to EA.

TABLE 7

COD* values during electrolysis of textile Samples 1 and 2 using EO unit followed by EA.

| EO | | | EA following 2 h EO | | |
|---|---|---|---|---|---|
| | COD removal (%) | | | COD removal (%) | |
| Time (h) | Sample 1 | Sample 2 | Time (min) | Sample 1 | Sample 2 |
| 0 | — | — | 15 | 93.1 | 94.2 |
| 15 | 2.96 | 1.92 | 30 | 94.5 | 95.8 |
| 30 | 4.32 | 2.72 | 45 | 95.9 | 96.8 |
| 60 | 6.32 | 5.63 | 60 | 97.5 | 97.7 |
| 120 | 9.22 | 8.48 | | | |

*Initial COD values; $COD_1$ = 1550 ppm $COD_2$ = 1615 ppm

TABLE 8

Basic parameters used for the treatment of dye-house effluent containing mixture of organic and inorganic.

| Treatment unit | Parameter | Measurement | Unit of measurement. |
|---|---|---|---|
| Uniform in all units | Total volume treated | 10 | L |
| | Electrodes type | 2 mesh | Ru—Ir coated Titanium anodes |
| | | 1 mesh | Titanium cathode |
| | Electrode diameter | 16.0 × 15.0 | cm |
| | Electrode surface area | 0.1 | $m^2$ |
| | Distance between electrodes | 3 | cm |
| | Current | 3 | A |
| | Cathodic current density | 30 | $A\,m^{-2}$ |
| | Flow rate | 8 | $L\,min^{-1}$ |
| | Voltage V1 | maximum | V |
| EO unit | Time T1 | 1 | h |
| ED Unit | | Not operated | |
| EA Unit | Time T3 | 1 | h |
| | Adsorbent | 1-3 mm granules size and 1690 g $L^{-1}$ density supplied from QFC-16 (Qualikems Fine Chemicals, China) | |

Example 3

Treatment of Corn Steep Water Effluent (Using EO and EA)

Steep water effluent from corn wet-milling industry contains mixed organic residues. This effluent results mainly from washing and soaking of corn kernels in water containing 0.1-0.2% sulfur dioxide ($SO_2$) at a temperature of 50-55° C. for 24 to 72 h. The physicochemical characteristics of these raw effluents are presented in Table 9. The effluents are characterized by a dark yellowish color containing a variety of organic and inorganic species with high COD, BOD, reduced sugars (as dextrose), lactic acid, phosphorus, and protein, (high TN value). The mean ratio $BOD_5$:COD of approximate 0.24, indicates that about 24% of the COD of this effluent is readily biodegradable [50]. Nevertheless, the remainder of COD is high, which indicates the need for an efficient treatment system.

TABLE 9

Characteristics of corn steep water effluent before treatment.

| Parameters | Mean value of real wastewater | Parameters | Mean value of real wastewater |
|---|---|---|---|
| Color | Tan to brown | Starch[a] | 2.55 |
| Odor | Strong moldiness | Lactic Acid[a] | 13.5 |
| Conductivity[b] | 14.7 | Dissolved oxygen (DO)[c] | 1.32 |
| TDS[a] | 109.1 | COD[a] | 106.5 |
| Ash[a] | 17.6 | BOD$_5$[a] | 26.0 |
| pH | 4.9 | Amino Acid[a] | 12.30 |
| SO$_2$[a] | 0.26 | Reducing Sugars (as dextrose)[a] | 25.1 |
| Crude protein[a] | 23.6 | Total Phosphorous[a] | 2.82 |

Units
[a]g/L,
[b]mS/cm, and
[c]mg/L

Initially, an amount of NaCl was dissolved in effluent to make a concentration of 0.1 M. The effluent was then transferred from the reservoir to the electrolysis chamber of either the EO unit or the EA unit, applying a current density of 60 A m$^{-2}$. The treatment period using the EO unit was for 4 hours followed by 16 h of EA after pH adjustment to 12 with CaO. Operating parameters of the electrochemical units are presented in Table 11.

The effluent showed low adsorption value in activated carbon granules with low remediation level obtained when treated using EA unit alone. The remediation level of effluent (pH=5.2) did not exceed 6.8% after 16 h electrolysis using EO unit. Raising the pH of solution to 12 induced the remediation level to reach 32.4%; about 15.0% of this value was due to precipitation caused by the high pH.

In comparison, steep water was effectively treated by 4 h of EO followed by 16 h of EA after pH adjustment to 12 with CaO. The removal efficiency was 93.5% with very low total energy consumption of 1.38 kWh/kg COD in the presence of 0.1. M NaCl as electrolyte and operating current density of 60 A/m$^2$.

Successive Application of EO and EA Units:

Although the remediation level when using EO/EA was comparably higher (COD removal 93.5%) than the level remediation using EA unit, the percentage of COD remains after this treatment is 6.5% which is still equivalent to unaccepted discharged concentration of 6,862 mol/L. The repetition for second treatment was performed by adding another 0.1 mol/L NaCl to the solution, electrolysed for 4 h using EO unit, followed by 4 h using EA unit, those by applying current density of 60 A/m$^2$. The results obtained from second treatment show not much COD removal alter 4 h EO stage and the value reached 93.6% (COD=6,787 mg/L) with relatively very high value of energy consumption (276.4 kWh for kg COD). Treating this solution by applying EA unit, the COD value is decreased dramatically and the removal rate reach 97.6, 98.5, 98.9, and 99.2% after 1, 2, 3, and 4 h, these values are corresponded to COD levels of 2514, 1609, 1204, and 820 mol/L respectively.

Figure 9:
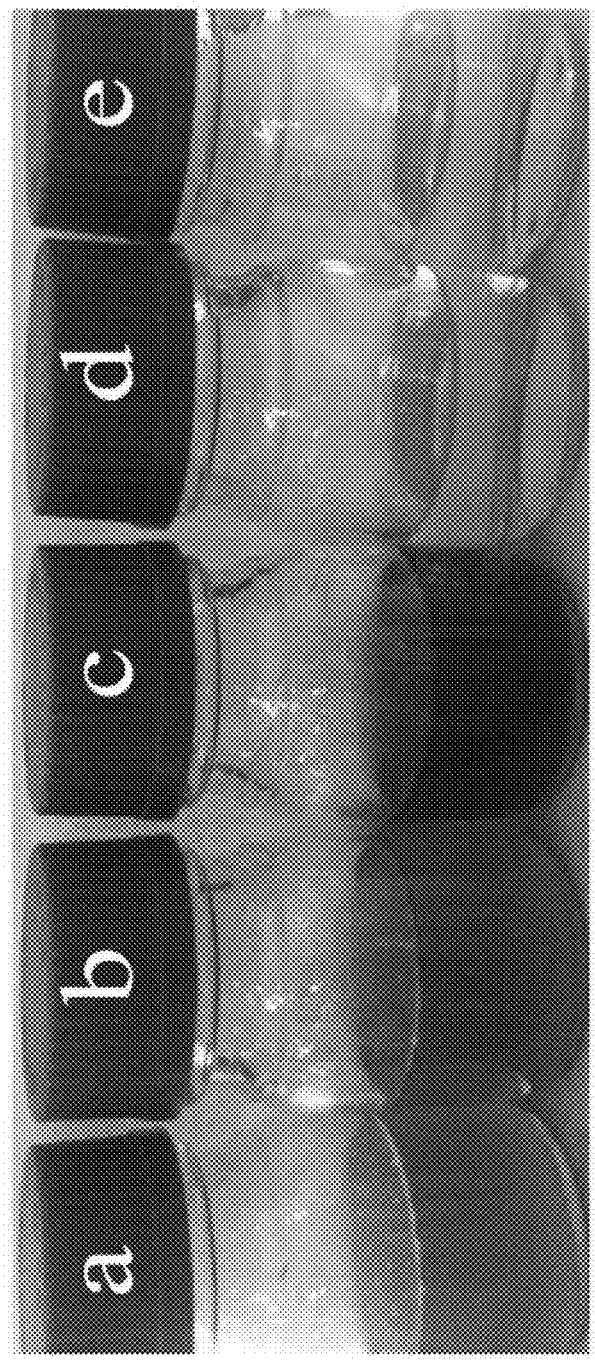
FIG. 9 is a photograph showing the results of the process as applied to steep water effluent: a) untreated, incoming steep water effluent; b) after filtering and adjustment to pH 12; c) after 4 h of EO; d) after 16 h of EA; e) after repeating EO+EA treatments.

The relatively very low final COD value indicates that the successive application of EO and EA more than once may be required for some recalcitrant effluents. The number of treatment cycles needed will depend on the nature and amount of pollutants present. Furthermore, analyses of the solutions which is resulted after the first and second successive treatment stages. Table 10 exhibit very low level of phosphorous, protein, lactic acid, and sugars molecules after first treatment, whereas, some of these material not appear within the detection limits of the analytical procedure after second treatment (see photograph of samples collected during treatment in FIG. 9).

TABLE 10

Ingredients level found in effluents after two successive EO/EA treatments.

| Ingredients | First EO + EA (mg/L) | Second EO + EA (mg/L) |
|---|---|---|
| Total phosphorous | 0.61 | Not found |
| Protein | 119.1 | 34.1 |
| Dissolved SO$_2$ | 0.13 | Not found |
| Reducing Sugars | Not found | Not found |
| Lactic Acid | Not found | Not found |
| COD | 6,862 | 820.0 |
| BOD$_5$ | 1,570 | 162.2 |

TABLE 11

Basic parameters used for the treatment of corn steep water effluent

| Treatment unit | Parameter | Measurement | Unit of measurement. |
|---|---|---|---|
| Uniform in all units | Total volume treated | 2 | Liters |
| | Electrodes type | 2 mesh | Ru—Ir coated Titanium anodes |
| | | 1 mesh | Titanium cathode |
| | Electrode diameter | 8.0 × 7.0 | cm |
| | Electrode surface area | 0.024 | m$^2$ |
| | Gap between electrodes | 2 | cm |
| | Current | 2 | A |
| | Cathodic current density | 60 | A m$^{-2}$ |
| | Voltage V1 | maximum | V |
| | Power supply | PS-303D | (KET, China) |
| | Flow rate | 1.2 | L min$^{-1}$ |
| EO unit | Time T1 | 4 | h |
| ED Unit | Not operated | | |
| EA Unit | Time T3 | 16 | h |
| | Adsorbent | 1-3 mm granules size and 1690 g L$^{-1}$ density supplied from QFC-16 (Qualikems Fine Chemicals, China) | |
| Successive EO/EA | | | |
| EO unit | Time T1 | 4 | h |
| EA Unit | Time T3 | 4 | h |

REFERENCES CITED

The following documents are incorporated herein by reference.

[1] P. P. Calow, Handbook of Ecotoxicology, John Wiley & Sons 2009.
[2] C. E. D. Dzombak, Remediation of Metals-Contaminated Soils and Groundwater, Technology Evaluation Report, 1997.
[3] A. Sigel, H. Sigel, R. K. O. Sigel, Royal Society of Chemistry (Great Britain), Organometallics in environment and toxicology, RSC Publishing, Cambridge, UK, 2010.
[4] M. Rivero-Huguet, W. D. Marshall, Scaling up a treatment to simultaneously remove persistent organic pollutants and heavy metals from contaminated soils, Chemosphere, 83 (2011) 668-673.
[5] R. M. Pérez, G. Cabrera, J. M. Gómez, A. Ábalos, D. Cantero, Combined strategy for the precipitation of heavy metals and biodegradation of petroleum in industrial wastewaters, Journal of Hazardous Materials, 182 (2010) 896-902.

[6] A. H. Sulaymon, S. A. Yousif, M. M. Al-Faize, Competitive biosorption of lead mercury chromium and arsenic ions onto activated sludge in fixed bed adsorber, Journal of the Taiwan Institute of Chemical Engineers, (2013) In-Press.

[7] S. Kocaoba, G. Akcin, Removal of chromium (III) and cadmium (II) from aqueous solutions, Desalination, 180 (2005) 151-156.

[8] A. H. Konsowa, Intensification of the rate of heavy metal removal from wastewater by cementation in a jet reactor, Desalination, 254 (2010) 29-34.

[9] A. J. Chaudhary, J. D. Donaldson, S. M. Grimes, N. G. Yasri, Separation of nickel from cobalt using electrodialysis in the presence of EDTA, J Appl Electrochem, 30 (2000) 439-445.

[10] A. Abou-Shady, C. Peng, J. Almeria O, H. Xu, Effect of pH on separation of Pb (II) and NO3- from aqueous solutions using electrodialysis, Desalination, 285 (2012) 46-53.

[11] H.-C. Tao, T. Lei, G. Shi, X.-N. Sun, X.-Y. Wei, L.-J. Zhang, W.-M. Wu, Removal of heavy metals from fly ash leachate using combined bioelectrochemical systems and electrolysis, Journal of Hazardous Materials, 264 (2014) 1-7.

[12] T. Wang, K. Kailasam, P. Xiao, G. Chen, L. Chen, L. Wang, J. Li, J. Zhu, Adsorption removal of organic dyes on covalent triazine framework (CTF), Microporous and Mesoporous Materials, 187 (2014) 63-70.

[13] S. R. Subashchandrabose, B. Ramakrishnan, M. Megharaj, K. Venkateswarlu, R. Naidu, Mixotrophic cyanobacteria and microalgae as distinctive biological agents for organic pollutant degradation, Environment International, 51 (2013) 59-72.

[14] J. Charles, G. Crini, N. Morin-Crini, P.-M. Badot, G. Trunfio, B. Sancey, M. de Carvalho, C. Bradu, S. Avramescu, P. Winterton, S. Gavoille, G. Torri, Advanced oxidation (UV-ozone) and cyclodextrin sorption: Effects of individual and combined action on the chemical abatement of organic pollutants in industrial effluents, Journal of the Taiwan Institute of Chemical Engineers, (2013).

[15] A. Durán, J. M. Monteagudo, I. San Martin, Photocatalytic treatment of an industrial effluent using artificial and solar UV radiation: An operational cost study on a pilot plant scale, J Environ Manage, 98 (2012) 1-4.

[16] S. G. Poulopoulos, F. Arvanitakis, C. J. Philippopoulos, Photochemical treatment of phenol aqueous solutions using ultraviolet radiation and hydrogen peroxide, Journal of Hazardous Materials, 129 (2006) 64-68.

[17] I. Ben Hariz, A. Halleb, N. Adhoum, L. Monser, Treatment of petroleum refinery sulfidic spent caustic wastes by electrocoagulation, Separation and Purification Technology, 107 (2013) 150-157.

[18] J. D. Donaldson, S. M. Grimes, N. G. Yasri, B. Wheals, J. Parrick, W. E. Errington, Anodic oxidation of the dye materials methylene blue, acid blue 25, reactive blue 2 and reactive blue 15 and the characterisation of novel intermediate compounds in the anodic oxidation of methylene blue, J Chem Technol Biot, 77 (2002) 756-760.

[19] A. J. Chaudhary, M.-u. Hassan, S. M. Grimes, Simultaneous recovery of metals and degradation of organic species: Copper and 2,4,5-trichlorophenoxyacetic acid (2,4,5-T), Journal of Hazardous Materials, 165 (2009) 825-831.

[20] E. Quivet, R. Faure, J. Georges, J. O. Paisse, B. Herbreteau, P. Lauteri, Photochemical degradation of imazamox in aqueous solution: influence of metal ions and anionic species on the ultraviolet photolysis, Journal of agricultural and food chemistry, 54 (2006) 3641-3645.

[21] H. Bradl, Heavy Metals in the Environment: Origin, Interaction and Remediation, Academic Press 2005.

[22] M. Carrier, N. Perol, J.-M. Herrmann, C. Bordes, S. Horikoshi, J. O. Paisse, R. Baudot, C. Guillard, Kinetics and reactional pathway of Imazapyr photocatalytic degradation influence of pH and metallic ions, Applied Catalysis B: Environmental, 65 (2006) 11-20.

[23] S. A. Nabi, M. Naushad, A. M. Khan, Sorption studies of metal ions on napthol blue-black modified Amberlite IR-400 anion exchange resin: Separation and determination of metal ion contents of pharmaceutical preparation, Colloids and Surfaces A: Physicochemical and Engineering Aspects, 280 (2006) 66-70.

[24] Z. Ujang, M. Hamdzah, H. Ozaki, A method for treating wastewater containing heavy metals, WO2010137941 A1, 2010.

[25] T. J. Soderquist, O. M. Chesniak, M. R. Witt, A. Paramo, V. A. Keeling. J. J. Keleher, Evaluation of the catalytic decomposition of H2O2 through use of organometallic complexes—a potential link to the luminol presumptive blood test, Forensic science international, 219 (2012) 101-105.

[26] M. R. Prairie, L. R. Evans, B. M. Stange, S. L. Martinez, An investigation of titanium dioxide photocatalysis for the treatment of water contaminated with metals and organic chemicals, Environmental Science & Technology, 27 (1993) 1776-1782.

[27] S. Katoh, Method of treating liquid wastes containing heavy metal chelate compounds, European Patent EP0168752 A2, 1986.

[28] D. D. Kaspar, P. E. Morkovsky, J. M. Petru, Process and apparatus for electrocoagulative treatment of industrial waste water, WO1999026887 A1, 1999.

[29] O. VIŠNJA, M. NENAD, P. DENIS, Process and device for electrochemical treatment of industrial wastewater and drinking water, WO2013144664 A1, 2013.

[30] T. Nandy, N. R. Neti, Carbon bed electrolyser for treatment of liquid effluents and a process thereof, WO2012076940 A1, 2012.

[31] A. J. Chaudhary, J. D. Donaldson, S. M. Grimes, J. R. Spencer, Method and apparatus for the destruction of dyes and other organic molecules, WO2003027029 A1, 2003.

[32] O. Scialdone, Electrochemical oxidation of organic pollutants in water at metal oxide electrodes: A simple theoretical model including direct and indirect oxidation processes at the anodic surface, Electrochimica Acta, 54 (2009) 6140-6147.

[33] G. Güven, A. Perendeci, A. Tanyolaç, Electrochemical treatment of deproteinated whey wastewater and optimization of treatment conditions with response surface methodology, Journal of Hazardous Materials, 157 (2008) 69-78.

[34] C. J. Israilides, A. G. Vlyssides, V. N. Mourafeti. G. Karvouni, Olive oil wastewater treatment with the use of an electrolysis system, Bioresour Technol, 61 (1997) 163-170.

[35] T.-H. Kim, C. Park, J. Lee, E.-B. Shin, S. Kim, Pilot scale treatment of textile wastewater by combined process (fluidized biofilm process-chemical coagulation-electrochemical oxidation), Water Res, 36 (2002) 3979-3988.

[36] J. Naumczyk, L. Szpyrkowicz, F. Zilio-Grandi, Electrochemical treatment of textile wastewater, Water Science and Technology, 34 (1996) 17-24.

[37] N. G. Yasri, Developments of electrochemistry in Environmental Technology, Brunel University, 2001, pp. 304.

[38] R. W. Houghton, A. T. Kuhn, Mass-transport problems and some design concepts of electrochemical reactors, J Appl Electrochem, 4 (1974) 173-190.

[39] L. J. J. Janssen, L. Koene, The role of electrochemistry and electrochemical technology in environmental protection, Chemical Engineering Journal, 85 (2002) 137-146.

[40] J. Grimm, D. Bessarabov, R. Sanderson, Review of electro-assisted methods for water purification, Desalination, 115 (1998) 285-294.

[41] A. J. Chaudhary, B. Ganguli, S. M. Grimes, The regeneration and recycle of chromium etching solutions using concentrator cell membrane technology, Chemosphere, 62 (2006) 841-846.

[42] C. Zhang, Y. Jiang, Y. Li, Z. Hu, L. Zhou, M. Zhou, Three-dimensional electrochemical process for wastewater treatment: A general review, Chemical Engineering Journal, 228 (2013) 455-467.

[43] Z. Ding, C. W. Min, W. Q. Hui, A Study on the Use of Bipolar-Particles-Electrodes in Decolorization of Dyeing Effluents and Its Principle, Water Science & Technology, 19 (1987) 391-400.

[44] C. Zhang, Y. H. Jiang, Y. L. Li, Z. X. Hu, L. Zhou, M. H. Zhou, Three-dimensional electrochemical process for wastewater treatment: A general review, Chemical Engineering Journal, 228 (2013) 455-467.

[45] S. S. Abd El Rehim, S. M. Sayyah, M. M. El Deeb, Electroplating of copper films on steel substrates from acidic gluconate baths, Applied Surface Science, 165 (2000) 249-254.

[46] A. Survila, Z. Mockus, S. Kanapecfcaitè, G. Stalnionis, Kinetics of zinc and copper reduction in gluconate-sulfate solutions, Electrochimica Acta, 94 (2013) 307-313.

[47] S. E. Manahan, Environmental Chemistry, 9 ed., CRC Press 2009.

[48] L. R. Czarnetzki, L. J. J. Janssen, Formation of hypochlorite, chlorate and oxygen during NaCl electrolysis from alkaline solutions at an RuO2/TiO2 anode, J Appl Electrochem, 22 (1992) 315-324.

[49] S. Song, L. Zhan, Z. He, L. Lin, J. Tu, Z. Zhang, J. Chen, L. Xu, Mechanism of the anodic oxidation of 4-chloro-3-methyl phenol in aqueous solution using Ti/SnO2-Sb/PbO2 electrodes, Journal of Hazardous Materials, 175 (2010) 614-621.

[50] A. Kumar, P. Dhall, R. Kumar, Redefining BOD:COD ratio of pulp mill industrial wastewaters in BOD analysis by formulating a specific microbial seed, International Biodeterioration & Biodegradation, 64 (2010) 197-202.

What is claimed is:

1. A method to remediate a liquid waste stream, the method comprising:
   (a) subjecting the waste stream containing organic pollutants and/or organometallic pollutants to electro-oxidation under reaction conditions wherein at least a portion of the organic pollutants, if present in the waste stream, are at least partially oxidized and a portion of the organometallic pollutants, if present in the waste stream, are at least partially oxidized; and then
   (b) subjecting the waste stream from step (a) to a further treatment selected from the group consisting of electro-deposition and/or electro-adsorption; wherein the electro-oxidation of step (a) and the electro-deposition step and/or the electro-adsorption of step (b) are conducted in separate chambers;
   wherein the electro-deposition of step (b) includes performing the electro-deposition in the presence of a concentrating cathode.

2. The method claim 1, wherein step (b) comprises subjecting the waste stream to electro-deposition and then electro-adsorption.

3. A method to remediate a liquid waste stream, the method comprising:
   (a) subjecting the waste stream containing organic pollutants and/or organometallic pollutants to electro-oxidation under reaction conditions wherein at least a portion of the organic pollutants, if present in the waste stream, are at least partially oxidized and a portion of the organometallic pollutants, if present in the waste stream, are at least partially oxidized; then
   (b) subjecting the waste stream from step (a) to a further treatment comprising electro-deposition, wherein the electro-deposition includes performing the electro-deposition in the presence of a concentrating cathode; and then
   (c) subjecting the waste stream from step (b) to a further treatment comprising electro-adsorption;
   wherein the electro-oxidation step, the electro-deposition step and the electro-adsorption step are conducted in separate chambers.

* * * * *